US012510234B2

(12) United States Patent
Lin

(10) Patent No.: US 12,510,234 B2
(45) Date of Patent: Dec. 30, 2025

(54) DECORATIVE TREE LAMP WITH DETACHABLE BASE AND DETACHABLE BRANCHES

(71) Applicant: Fangfang Lin, Taizhou (CN)

(72) Inventor: Fangfang Lin, Taizhou (CN)

(*) Notice: Subject to any disclaimer, the term of this patent is extended or adjusted under 35 U.S.C. 154(b) by 0 days.

(21) Appl. No.: 19/070,837

(22) Filed: Mar. 5, 2025

(65) Prior Publication Data

US 2025/0334255 A1 Oct. 30, 2025

Related U.S. Application Data

(63) Continuation-in-part of application No. 18/667,507, filed on May 17, 2024.

(30) Foreign Application Priority Data

Apr. 26, 2024 (CN) ......................... 202420883413.8

(51) Int. Cl.

| | |
|---|---|
| ***F21V 21/06*** | (2006.01) |
| ***A41G 1/00*** | (2006.01) |
| *F21W 121/00* | (2006.01) |

(52) U.S. Cl.

CPC .............. *F21V 21/06* (2013.01); *A41G 1/007* (2013.01); *F21W 2121/00* (2013.01)

(58) Field of Classification Search

CPC .. H01R 13/052; H01R 13/0815; H01R 13/17; H01R 13/207; H01R 33/20–225;

(Continued)

(56) References Cited

U.S. PATENT DOCUMENTS 6,030,670 A * 2/2000 Chang .................... A41G 1/005 362/123
11,732,845 B1 * 8/2023 Xu ......................... H01R 33/94 362/382

(Continued)

FOREIGN PATENT DOCUMENTS

KR 200322622 Y1 * 8/2003 ............. A41G 1/001
WO WO-9626661 A1 * 9/1996 ............. A47G 33/06

OTHER PUBLICATIONS

Machine translation of KR200322622Y1, retrieved from http://kposd.kipo.go.kr:8088/up/kpion/ on Apr. 29, 2025 (Year: 2025).*

*Primary Examiner* — Abdulmajeed Aziz
*Assistant Examiner* — Steven Y Horikoshi

(57) ABSTRACT

Provided in the present application is a decorative tree lamp. The decorative tree lamp includes: a lamp housing, a light-emitting body, and a base. The lamp housing is configured to have a tree shape, an accommodating cavity is formed inside the lamp housing, a mounting part is formed at a lower end of the lamp housing, and electric contacts are also arranged at the lower end of the lamp housing; the light-emitting body is arranged in the accommodating cavity, and the light-emitting body is electrically connected to the electric contacts; a power supply unit is arranged inside the base, a mounting groove is formed in a top surface of the based, conductive structures are arranged in the mounting groove, and the conductive structures are electrically connected to the power supply unit; and the mounting part is mounted at the mounting groove in a detachable manner.

16 Claims, 28 Drawing Sheets

(58) Field of Classification Search
CPC .. F21S 8/032; F21S 6/002; A47G 2033/0827; A47G 2033/122; A47G 33/06; A41G 1/004; A41G 1/005; A41G 1/007; F21V 21/06; F21W 2121/04
See application file for complete search history.

(56) References Cited

U.S. PATENT DOCUMENTS

| | | | | |
|---|---|---|---|---|
| 11,793,342 | B1 * | 10/2023 | Hall | A47G 33/06 |
| 2005/0168973 | A1 * | 8/2005 | Chuang | A41G 1/005<br>362/234 |
| 2009/0052168 | A1 * | 2/2009 | Chen | F21V 3/02<br>362/237 |

* cited by examiner

DECORATIVE TREE LAMP WITH DETACHABLE BASE AND DETACHABLE BRANCHES

CROSS-REFERENCE TO RELATED APPLICATION

This application is a Continuation-In-Part application of U.S. patent application Ser. No. 18/667,507, filed on May 17, 2024, which claims priority to Chinese Patent Application No. 202420883413.8, filed Apr. 26, 2024, each of which is entirely incorporated herein by reference.

TECHNICAL FIELD

The present application relates to the technical field of decorative lamps, and in particular to a decorative tree lamp.

BACKGROUND

A decorative tree lamp is a decorative lamp that imitates the shape of a tree, which not only can provide illumination, but also has a strong ornamental value. Therefore, the decorative tree lamp can be widely applied to various scenarios, such as squares, courtyards, hotel lobbies, living rooms or bedrooms.

The decorative tree lamp in the related art includes a lamp housing on the upper part and a base at the bottom. Due to the constraint of wires, it is difficult to completely separate the lamp housing and the base at the bottom. When the base is required to be repaired separately, it will be more inconvenient.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one aspect, a decorative tree lamp is provided, comprising:

- a lamp housing, which is constructed to resemble the shape of a tree, with an accommodating cavity inside;
- a light-emitting body, which is installed inside or outside the lamp housing;
- a base, detachably connected to the lamp housing;
- artificial branches, detachably installed on the side wall of the lamp housing;
- wherein the bottom of the lamp housing is provided with a first mounting portion, the base is correspondingly provided with a second mounting portion, and the first mounting portion is detachably connected to the second mounting portion, when the first mounting portion and the second mounting portion are connected, the light-emitting body is energized.

In another aspect, a decorative tree lamp is provided, comprising:

- a lamp housing, which is constructed to resemble the shape of a tree;
- a light-emitting body, which is installed inside or outside the lamp housing for emitting light;
- a base, which is used to support the lamp housing. the light-emitting body is detachably connected to the base, and when the light-emitting body is connected to the base, the light-emitting body is energized;
- artificial branches, detachably installed on the side wall of the lamp housing.

In another aspect, a decorative tree lamp is provided, comprising:

- a lamp housing, which is constructed to resemble the shape of a tree, with an accommodating cavity inside;
- a light-emitting body, which is installed inside or outside the lamp housing;
- a base, which is detachably connected to the lamp housing;
- artificial branches, detachably installed on the side wall of the lamp housing;
- wherein the bottom of the lamp housing is provided with a first mounting portion, and the base is correspondingly provided with a second mounting portion. the first mounting portion and the second mounting portion are detachably connected through a mechanical connection structure;
- the first mounting portion is provided with a first conductive structure, and the second mounting portion is provided with a second conductive structure; when the first mounting portion is connected to the second mounting portion, the first conductive structure, and the second conductive structure are electrically connected, and the light-emitting body is energized.

The above aspects or examples and advantages, as well as other aspects or examples and advantages, will become apparent from the ensuing description and accompanying drawings.

BRIEF DESCRIPTION OF DRAWINGS

For exemplification purposes, and not for limitation purposes, aspects, embodiments or examples of the invention are illustrated in the figures of the accompanying drawings, in which.

REFERENCE NUMBER

Figure 1:
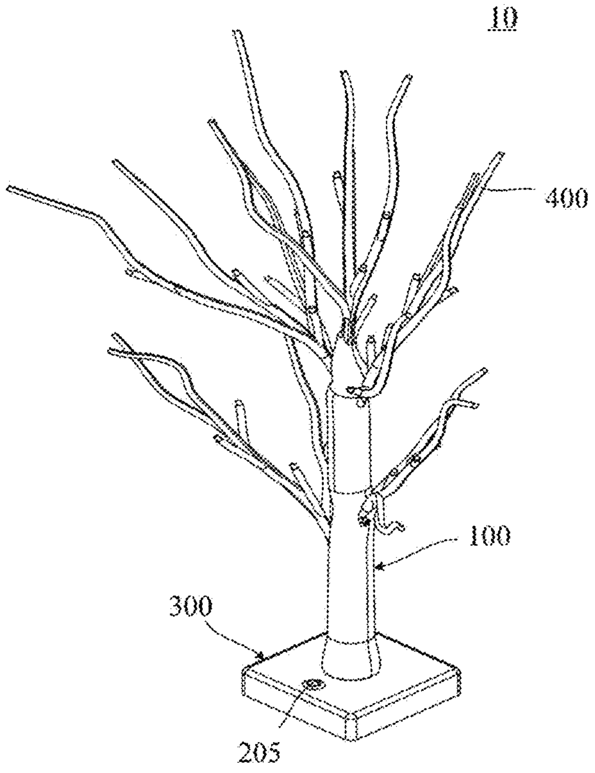
FIG. 1 is a schematic diagram of the overall structure of a decorative tree lamp according to an embodiment of the present application.

10—decorative tree lamp;

100—lamp housing; 102—first housing; 103—second housing; 104—first mounting portion; 1041—external thread; 1042—first stopper; 105—third mounting portion; 106—fifth mounting portion; 107—seventh mounting portion; 108—wiring outlet; 109—wire-fixing structure;

200—light-emitting body; 201—power supply unit; 2011—battery; 2012—battery interface; 2013—USB port; 2014—solar panel; 2015—wireless-charging receiving coil; 2016—wireless-charging transmitting coil; 2017—receiving-end insulating cover; 2018—transmitting-end insulating cover; 202—wire; 203—first conductive structure; 2031—first contact; 2032—second contact; 2033—plug; 204—circuit board; 205—control switch;

300—base; 301—second mounting portion; 3011—internal thread; 3012—second stopper; 302—second conductive structure; 3021—first contact plate; 3022—second contact plate; 3023—socket; 3024—insertion hole; 320—upper housing; 330—lower cover plate;

400—artificial branch; 401—fourth mounting portion;

500—artificial leaf; 501—sixth mounting portion;

600—artificial fruit; 601—eighth mounting portion;

DETAILED DESCRIPTION OF EMBODIMENTS

The present disclosure will be further described in detail below with reference to the drawings. A preferred embodiment is described in the drawings. However, the present disclosure can be implemented in many different forms and is not limited to the embodiments described herein. Rather, these embodiments are provided to provide a thorough understanding of the present disclosure. The specific embodiments are only explanations of the present disclosure, and the embodiments are not intended to limit the present disclosure. Rather, various modifications may be made in the details within the scope and range of equivalents of the claims and without departing from the present disclosure.

The present disclosure will be described in more details below with reference to the accompanying drawings and in conjunction with embodiments. The examples are provided for better illustration of the present disclosure and should not limit the scope of the present disclosure. In practice, technicians skilled in the art might make small modifications and/or variations of the present disclosure without departing from the scope or spirit of the present disclosure. For example, features described in part of one embodiment may be used in another to create a new embodiment. It is therefore desirable that the present disclosure encompass such modifications and/or variations falling within the scope of the appended claims and their equivalents.

In the description of the present disclosure, terms like “longitudinal”, “transverse”, “up”, “down”, “front”, “back”, “left”, “right”, “vertical”, “horizontal”, “top”, “bottom” denote orientation or positional relationships based on those shown in the drawings and are intended for ease of description only, which in no way entails that the present disclosure must be constructed and operated in a particular orientation and therefore cannot be construed as limiting to the present disclosure. Terms like “joint”, “attach” and “set” used in the present disclosure should be understood in a broad sense, for example, may indicate a direct connection or indirect connection through intermediate components; and it may be a wired electrical connection, a radio connection, or a wireless communication signal connection. The exact meanings of the above terms may slightly differ and should be derived from the actual situation by technicians skilled in the art accordingly.

Figure 2:
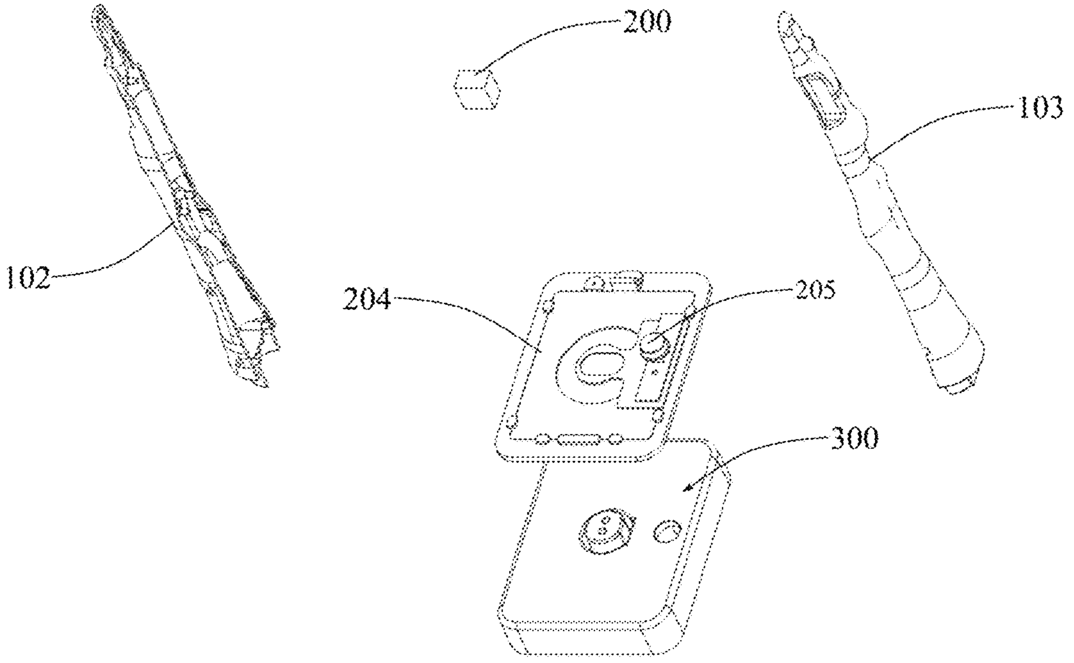
FIG. 2 is an exploded view of the decorative tree lamp according to an embodiment of the present application.
Figure 3:
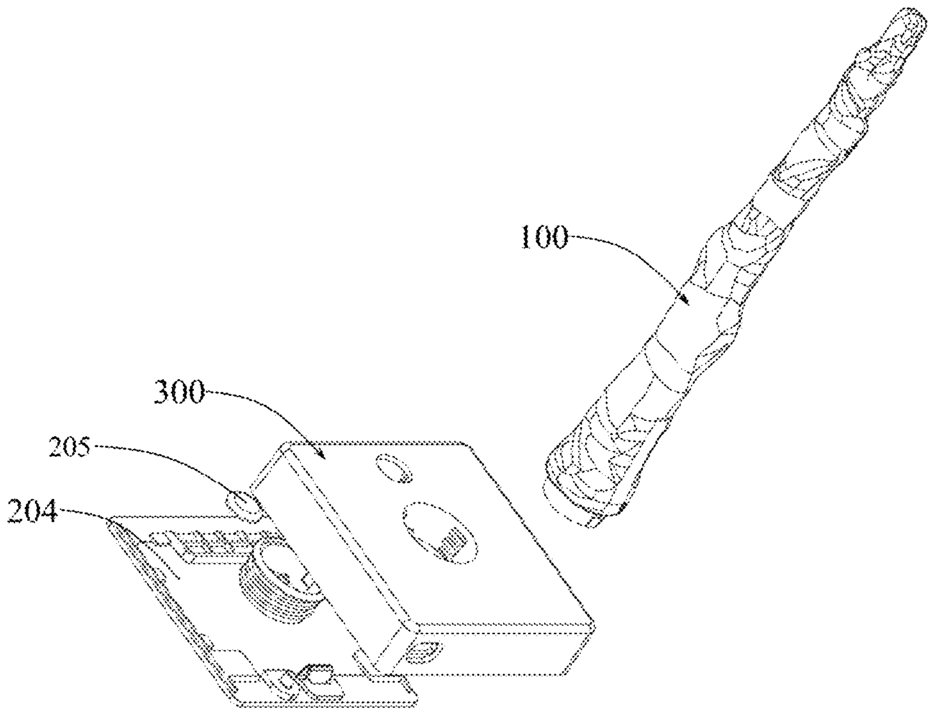
FIG. 3 is an exploded view of the decorative tree lamp according to another embodiment of the present application.

As shown in FIGS. 1-3, the present application provides a decorative tree lamp 10, comprising a lamp housing 100, a light-emitting body 200, and a base 300. The lamp housing 100 is constructed to resemble the shape of a tree.

A. Lamp Housing

In this embodiment, the interior of the lamp housing 100 is provided with an accommodating cavity to accommodate electrical components and wires, as shown in FIG. 2.

In this embodiment, the material of the lamp housing 100 is resin, plastic, metal, etc. For example, the material of the lamp housing 100 can be a thermosetting resin, which provides the lamp housing 100 with good hardness and high-temperature resistance.

In this embodiment, the lamp housing 100 has a split structure. For example, as shown in FIG. 2, the lamp housing 100 includes a first housing 101 and an interconnected second housing 102. The first housing 101 and the second housing 102 can be manufactured separately. Before connecting the first housing 101 and the second housing 102, the light-emitting body 200 can be assembled with the first housing 102 or the second housing 103. Afterward, the first housing 102 and the second housing 103 can be connected through methods such as screw fastening or adhesive bonding.

In Embodiment 1, the lamp housing 100 has an integrated structure. For example, as shown in FIG. 3, the difference from this embodiment is that the lamp housing 100 is formed as a single piece through processes such as injection molding, die casting, or 3D printing.

In this embodiment, to enable the installation of the lamp housing 100 and the base 300, as shown in FIGS. 4-7, the bottom of the lamp housing 100 has a first mounting portion 104, and the base 300 is correspondingly provided with a second mounting portion 301. The first mounting portion 104 is detachably connected to the second mounting portion 301, allowing the lamp housing 100 to be detachably connected to the base 300.

In this embodiment, the lamp housing 100 and the base 300 are installed via a threaded connection. For example, as shown in FIGS. 4-7, the first mounting portion 110 is a threaded post with an external thread 1041 fixed at the bottom of the lamp housing 100, and the second mounting portion 301 is a threaded hole with an internal thread provided on the base 300 to match the threaded post. The threaded post is aligned with the threaded hole, and the lamp housing 100 is screwed into the threaded hole of the base 300 to complete the installation.

Figure 8:
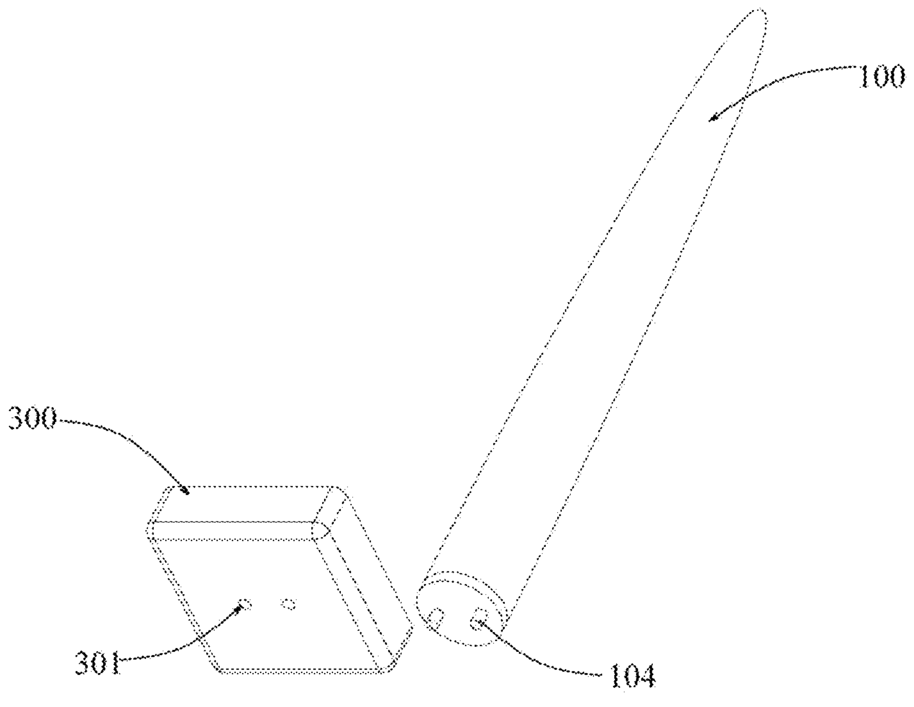
FIG. 8 is an exploded view of the base and lamp housing according to Embodiment 2 of the present application.

In Embodiment 2, the lamp housing 100 and the base 300 are installed via an insertion connection. For example, as shown in FIG. 8, the difference from this embodiment is that the first mounting portion 104 is a plug fixed at the bottom of the lamp housing 100, such as a straight rod, tapered rod, or tenon, and the second mounting portion 301 is a socket provided on the base 300 to match the plug. The plug is aligned with the socket, and the lamp housing 100 is pressed firmly to insert the plug into the socket, completing the installation.

Figure 9:
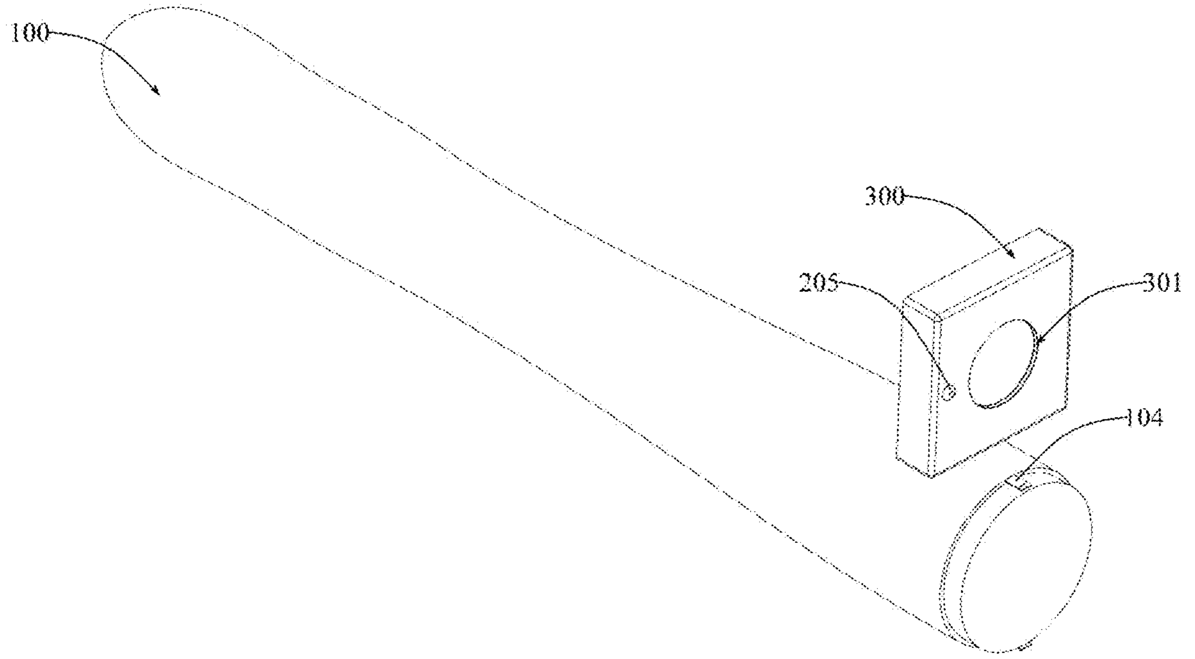
FIG. 9 is an exploded view of the base and lamp housing according to an example of Embodiment 3 of the present application.
Figure 10:
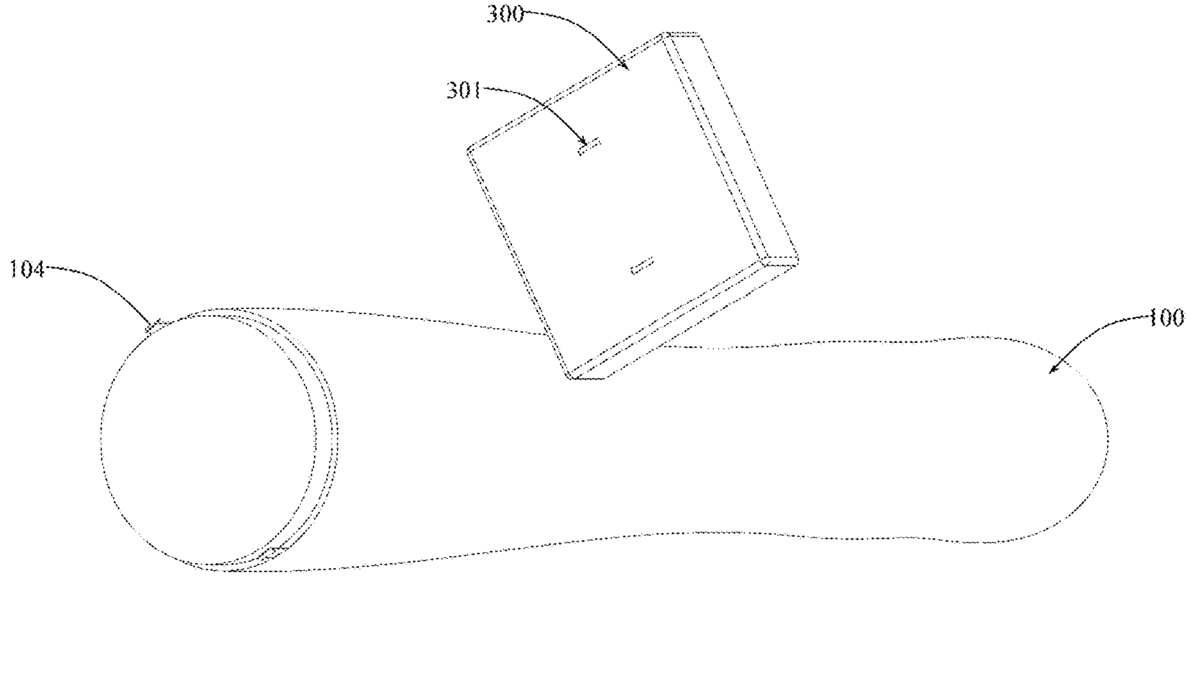
FIG. 10 is an exploded view of the base and lamp housing according to another example of Embodiment 3 of the present application.

In Embodiment 3, the lamp housing 100 and the base 300 are installed via a snap-fit connection. For example, as shown in FIGS. 9-10, the difference from this embodiment is that the first mounting portion 104 is a snap-fit fastener fixed at the bottom of the lamp housing 100, such as a barb or claw, and the second mounting portion 301 is a snap-fit slot provided on the base 300 to match the fastener. The fastener is aligned with the slot, and the lamp housing 100 is pressed firmly to snap the fastener into the slot, completing the installation.

Figure 11:
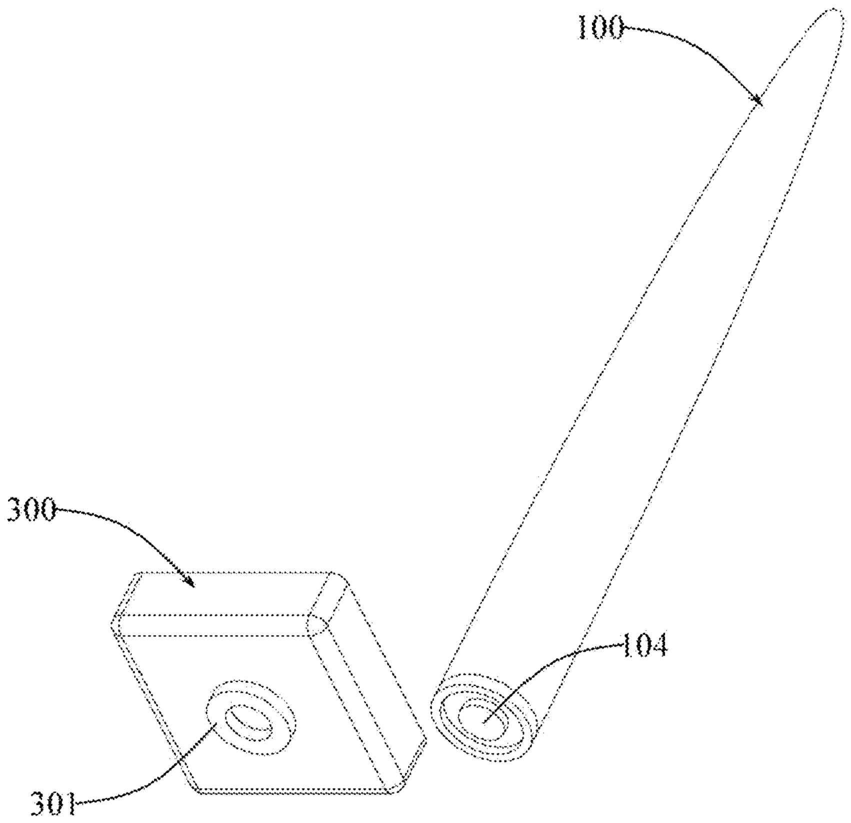
FIG. 11 is an exploded view of the base and lamp housing according to an example of Embodiment 4 of the present application.
Figure 12:
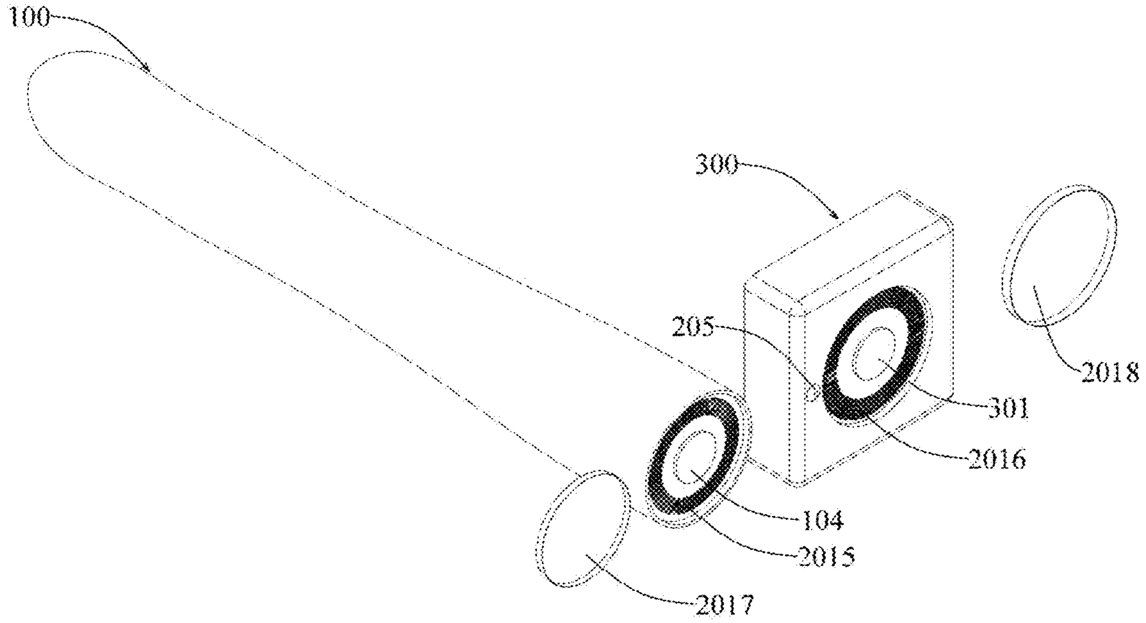
FIG. 12 is an exploded view of the base and lamp housing according to another example of Embodiment 4 of the present application.

In Embodiment 4, the lamp housing 100 and the base 300 are mechanically connected via magnetic attraction. For example, as shown in FIGS. 11-12, the difference from this embodiment is that the first mounting portion 104 is a magnet embedded at the bottom of the lamp housing 100, such as a neodymium magnet, and the second mounting portion 301 is a magnet embedded at the top of the base 300 with an opposite polarity to the magnet at the bottom of the lamp housing 100. The magnet at the bottom of the lamp housing 100 is brought close to the magnet at the top of the base 300, and the magnets attract each other to complete the installation.

Figure 36:
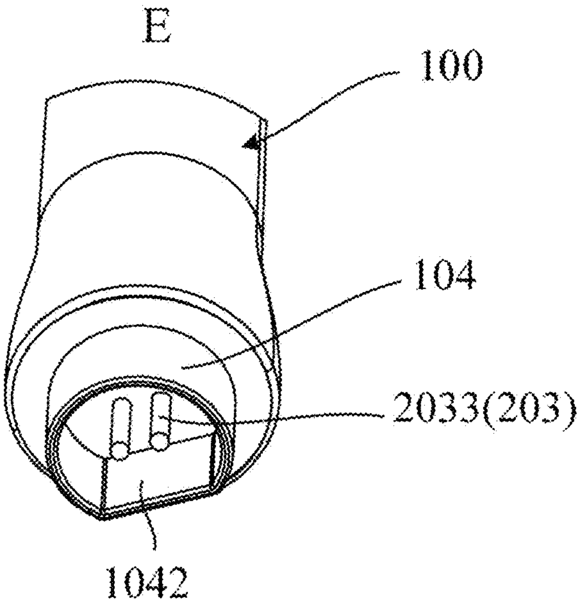
FIG. 36 is an enlarged view of part E in FIG. 35.
Figure 37:
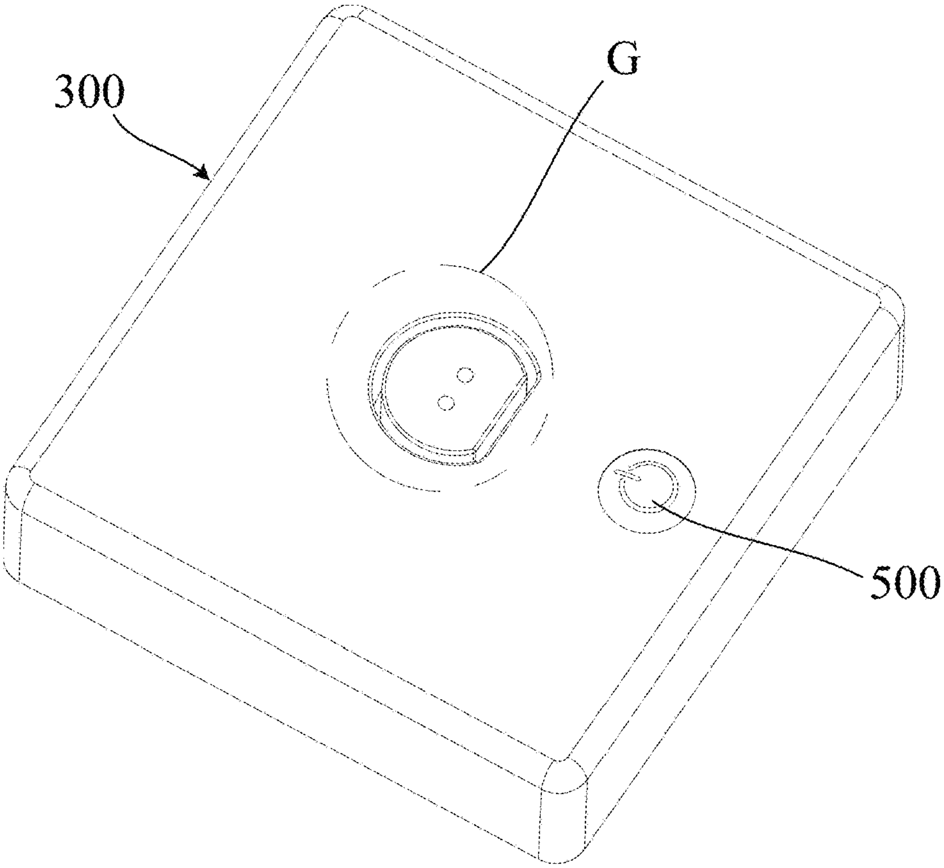
FIG. 37 is a schematic diagram of the overall structure of the base according to Embodiment 5 of the present application.
Figure 38:
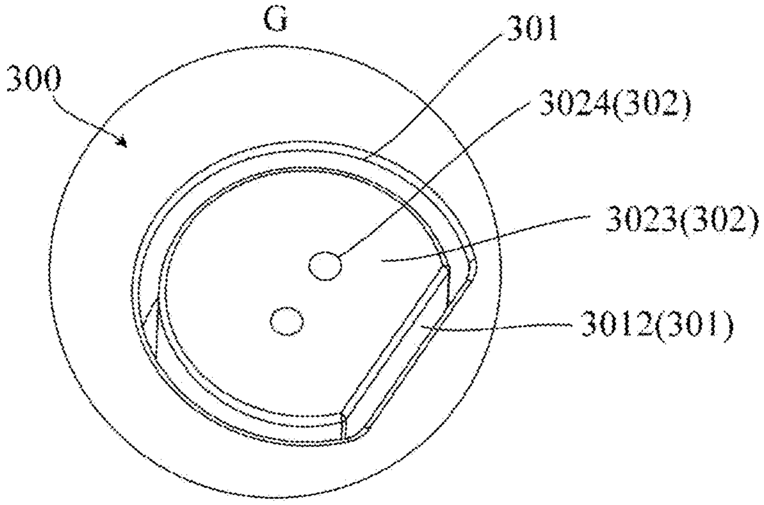
FIG. 38 is an enlarged view of part G in FIG. 37.

In Embodiment 5, to prevent the lamp housing 100 from rotating relative to the base 300, as shown in FIGS. 36 and 38, the first mounting portion 104 further includes a first stopper 1042, and the second mounting portion 301 further includes a second stopper 3012. The shape of the first stopper 1042 matches the shape of the second stopper 3012, allowing them to fit tightly together, thereby achieving an anti-rotation connection between the lamp housing 100 and the base 300.

In some embodiments, the first stopper 1042 is a protrusion, and the second stopper 3012 is a groove. The shapes of the protrusion and the groove match, allowing them to fit tightly together, thereby achieving an anti-rotation connection between the lamp housing 100 and the base 300.

In some embodiments, The lamp housing 100 and base 300 can be locked to prevent rotation using magnetic force, threaded connections, snap-fit mechanisms, or friction.

B. Artificial Branches

Figure 4:
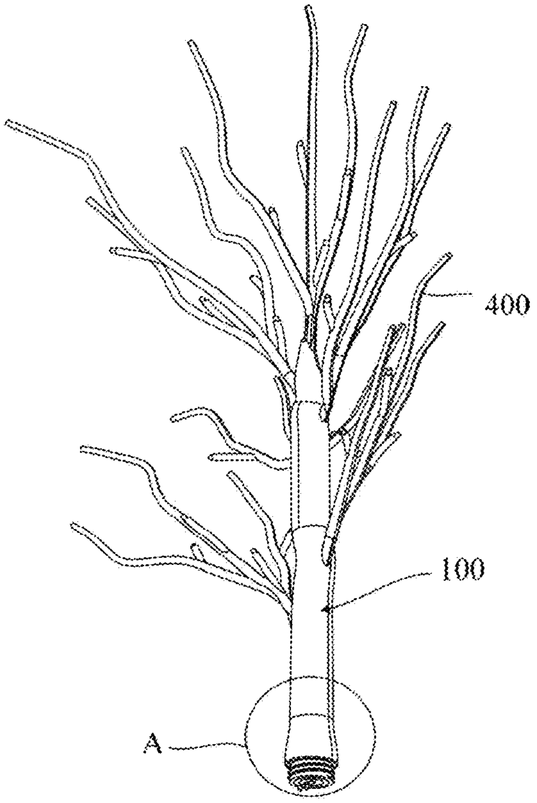
FIG. 4 is a schematic diagram of the assembly structure of the lamp housing and artificial branches according to an embodiment of the present application.
Figure 5:
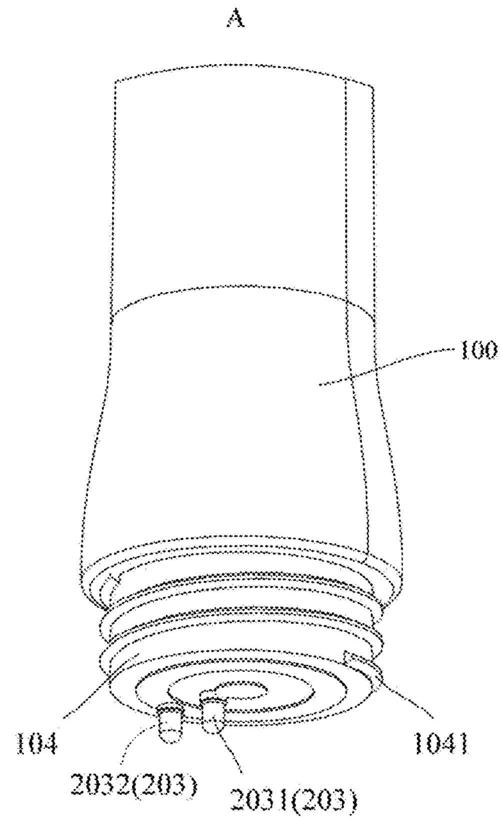
FIG. 5 is an enlarged view of part A in FIG. 4.
Figure 6:
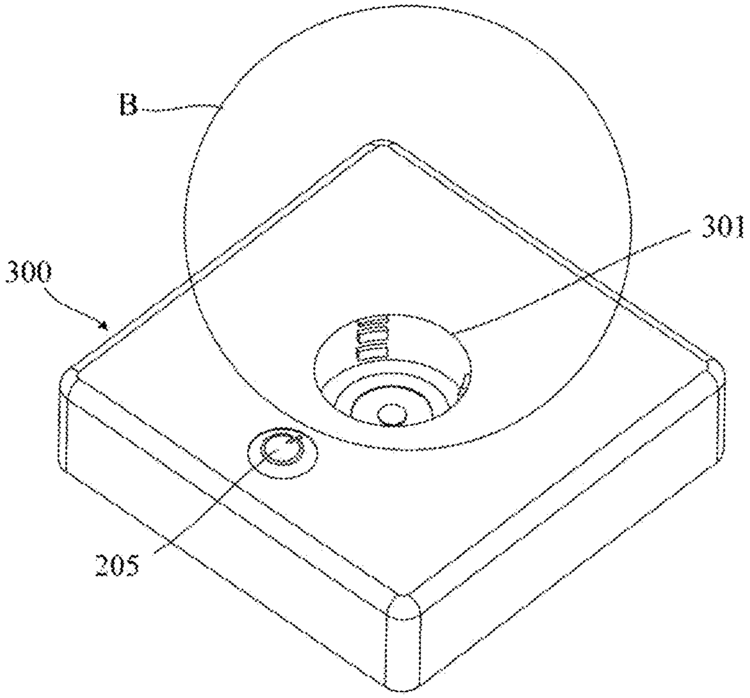
FIG. 6 is a schematic diagram of the overall structure of the base according to an embodiment of the present application.
Figure 7:
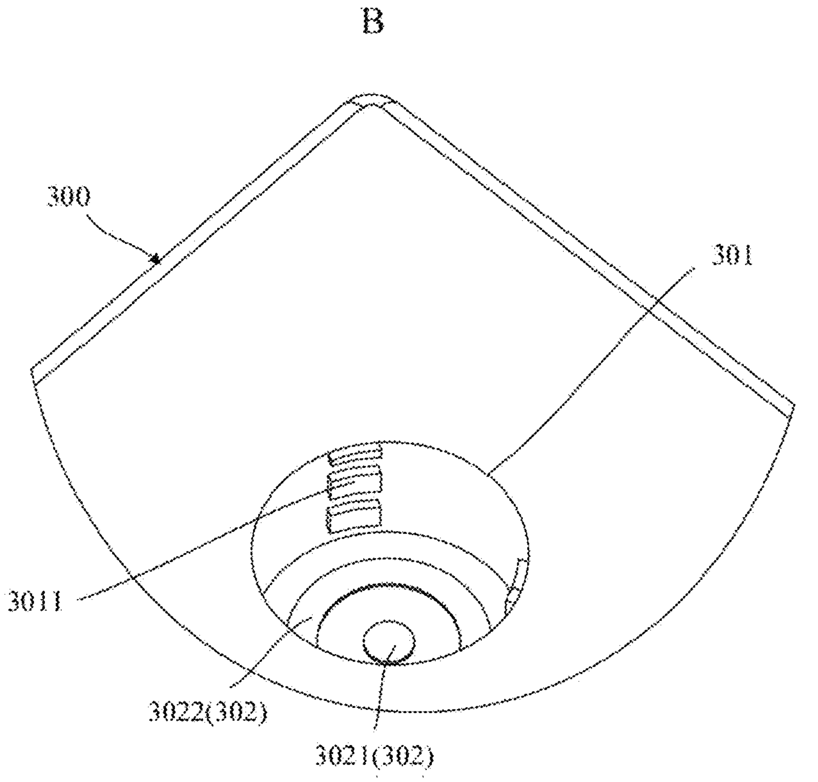
FIG. 7 is an enlarged view of part B in FIG. 6.

In this embodiment, to make the decorative tree lamp 10 closer to a real tree in appearance and meet customers' diverse visual needs, as shown in FIGS. 1 and 4, the decorative tree lamp 10 further includes multiple artificial branches 400.

Figure 13:
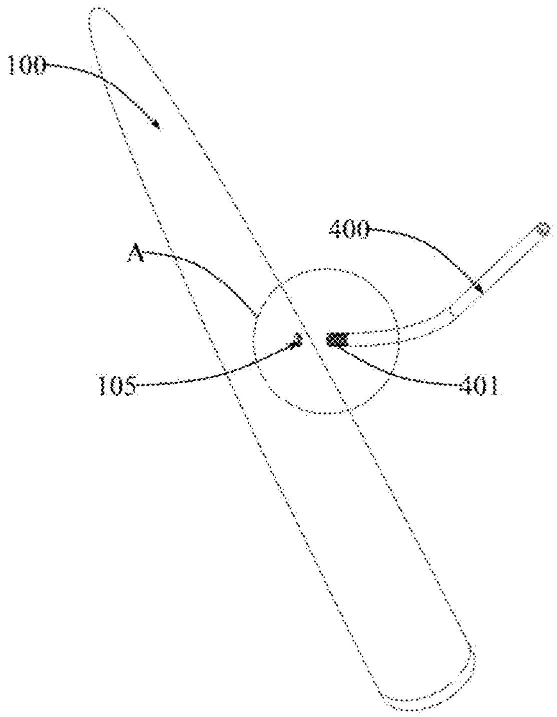
FIG. 13 is an exploded view of the lamp housing and artificial branches according to an embodiment of the present application.

In this embodiment, the artificial branches 400 are installed on the lamp housing 100. As shown in FIG. 13, the side wall of the lamp housing 100 has a third mounting portion 105, and the artificial branches 400 are correspondingly provided with a fourth mounting portion 401. The third mounting portion 105 is detachably connected to the fourth mounting portion 401, allowing the artificial branches 400 to be detachably connected to the lamp housing 100.

Figure 14:
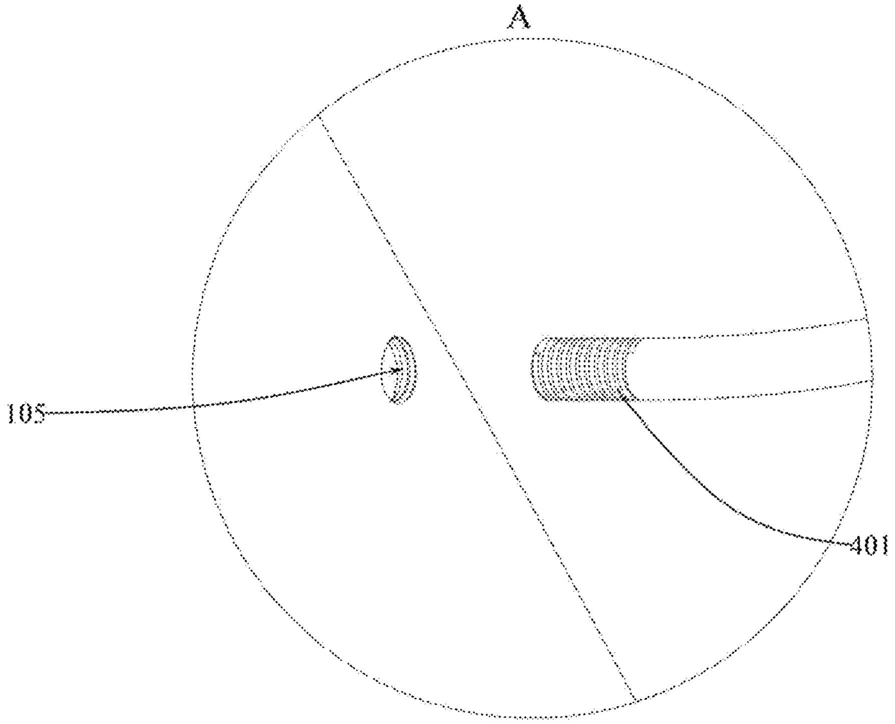
FIG. 14 is an enlarged view of part A in FIG. 13.

In this embodiment, the artificial branches 400 and the lamp housing 100 are installed via a threaded connection. For example, as shown in FIGS. 13-14, the third mounting portion 105 is a threaded hole with an internal thread provided on the side wall of the lamp housing 100, and the fourth mounting portion 401 is the threaded end of the artificial branch 400 with an external thread. The artificial branch 400 is screwed into the threaded hole of the lamp housing 100 to complete the installation.

Figure 15:
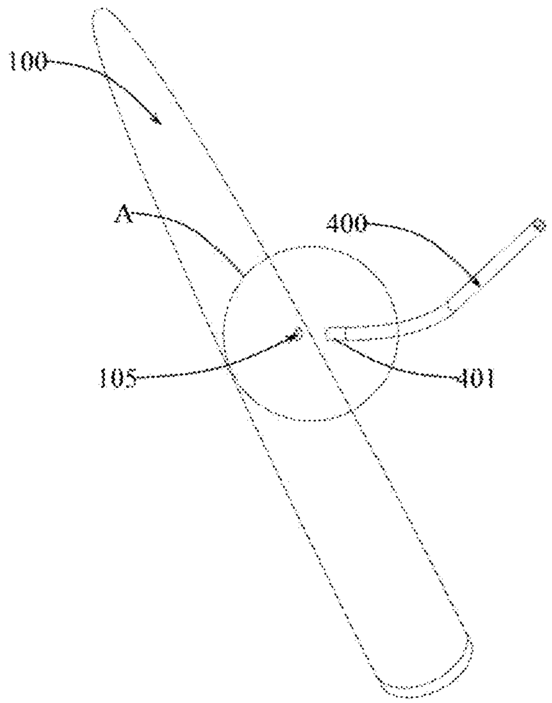
FIG. 15 is an exploded view of the lamp housing and artificial branches according to Embodiment 6 of the present application.
Figure 16:
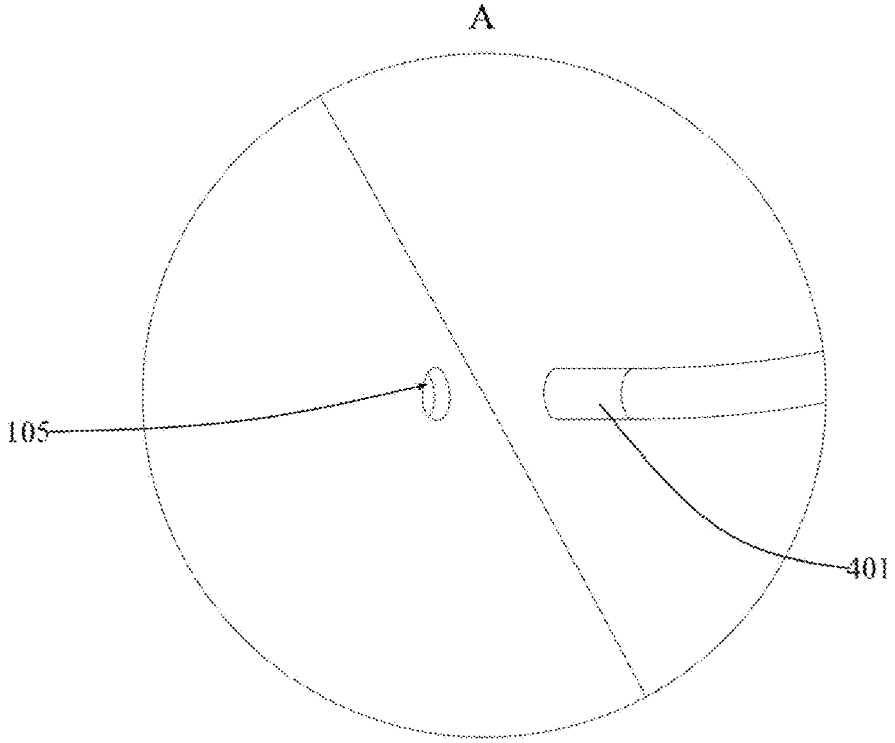
FIG. 16 is an enlarged view of part A in FIG. 15.

In Embodiment 6, the artificial branches 400 and the lamp housing 100 are installed via an insertion connection. For example, as shown in FIGS. 15-16, the difference from this embodiment is that the third mounting portion 105 is an insertion hole provided on the side wall of the lamp housing 100, and the fourth mounting portion 401 is the end of the artificial branch 400 that matches the insertion hole, which can be shaped like a cylinder, cone, or other forms. The end of the artificial branch 400 is aligned with the insertion hole, and the artificial branch 400 is pressed firmly to insert the end into the insertion hole, completing the installation.

Figure 17:
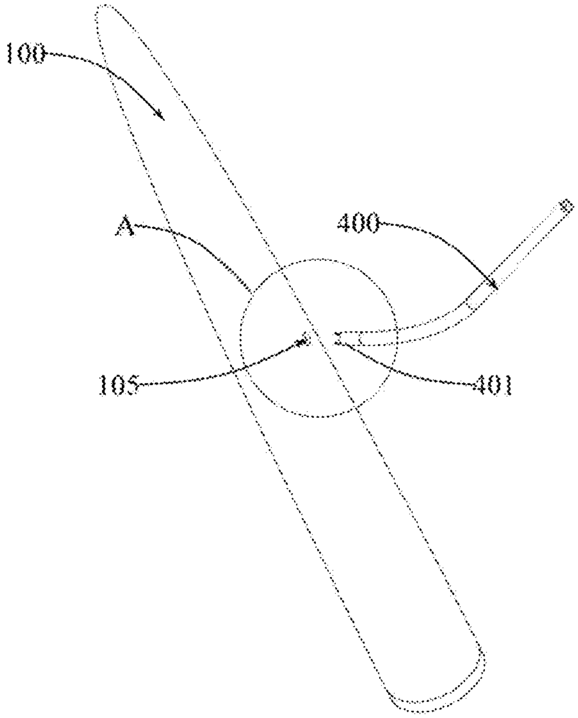
FIG. 17 is an exploded view of the lamp housing and artificial branches according to Embodiment 7 of the present application.
Figure 18:
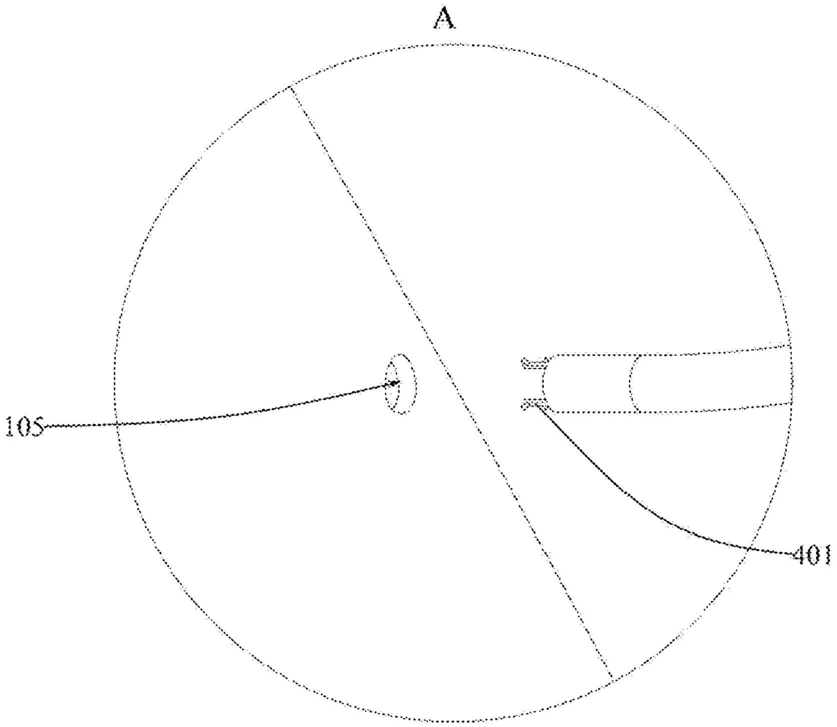
FIG. 18 is an enlarged view of part A in FIG. 17.

In Embodiment 7, the artificial branches 400 and the lamp housing 100 are installed via a snap-fit connection. For example, as shown in FIGS. 17-18, the difference from this embodiment is that the third mounting portion 105 is a snap-fit hole provided on the side wall of the lamp housing 100, and the fourth mounting portion 401 is a snap-fit fastener fixed on the artificial branch 400 that matches the snap-fit hole, such as a barb or claw. The fastener is aligned with the snap-fit hole, and the artificial branch 400 is pressed firmly to snap the fastener into the hole, completing the installation.

Figure 19:
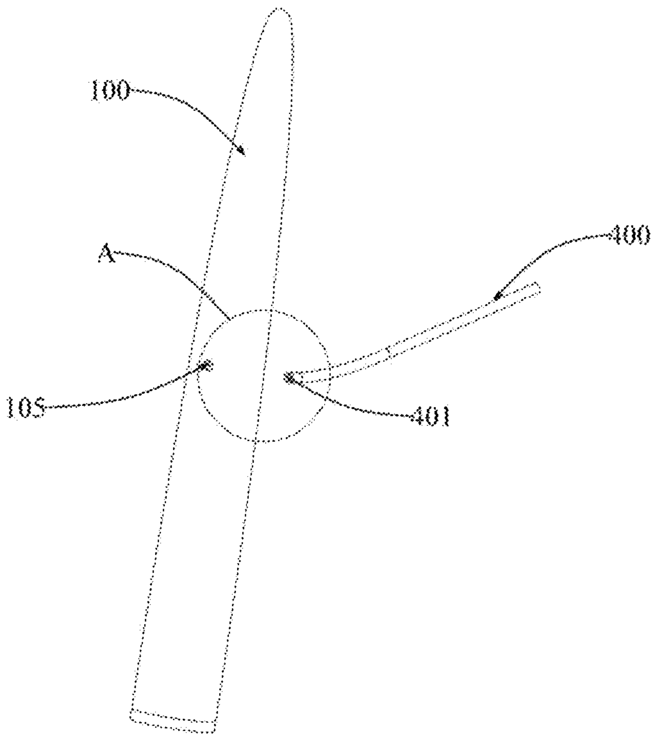
FIG. 19 is an exploded view of the lamp housing and artificial branches according to Embodiment 8 of the present application.
Figure 20:
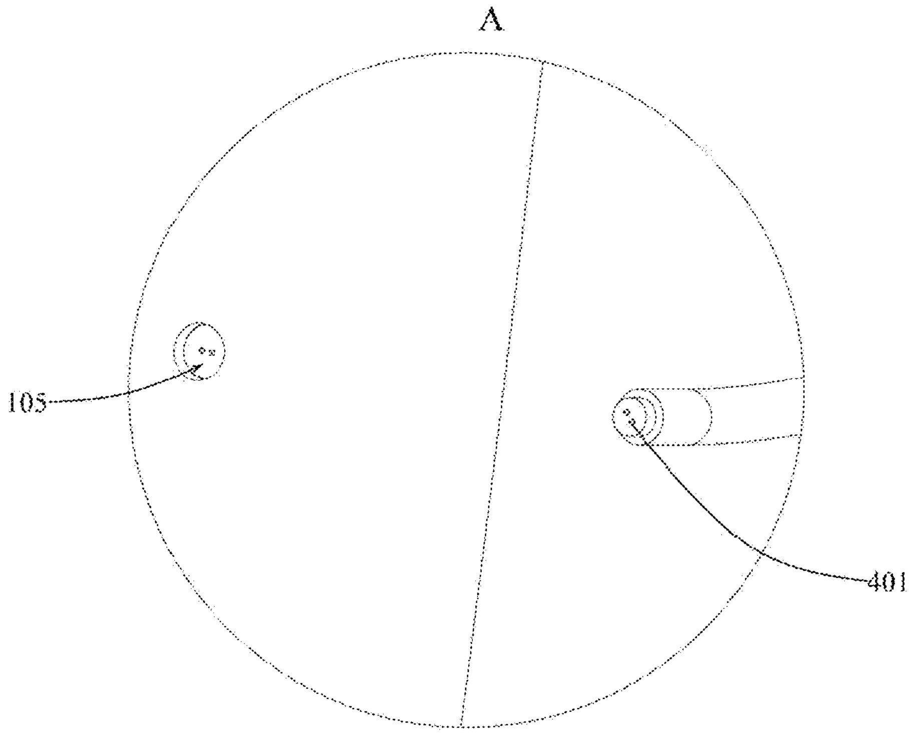
FIG. 20 is an enlarged view of part A in FIG. 19.

In Embodiment 8, the artificial branches 400 and the lamp housing 100 are installed via magnetic attraction. For example, as shown in FIGS. 19-20, the difference from this embodiment is that the third mounting portion 105 is a magnet embedded in the side wall of the lamp housing 100, such as a neodymium magnet, and the fourth mounting portion 401 is a magnet embedded at the end of the artificial branch 400 with an opposite polarity to the magnet in the side wall of the lamp housing 100. The magnets at the end of the artificial branch 400 and the side wall of the lamp housing 100 are arranged opposite each other. The magnet at the end of the artificial branch 400 is brought close to the magnet in the side wall of the lamp housing 100, and the magnets attract each other to complete the installation.

Figure 21:
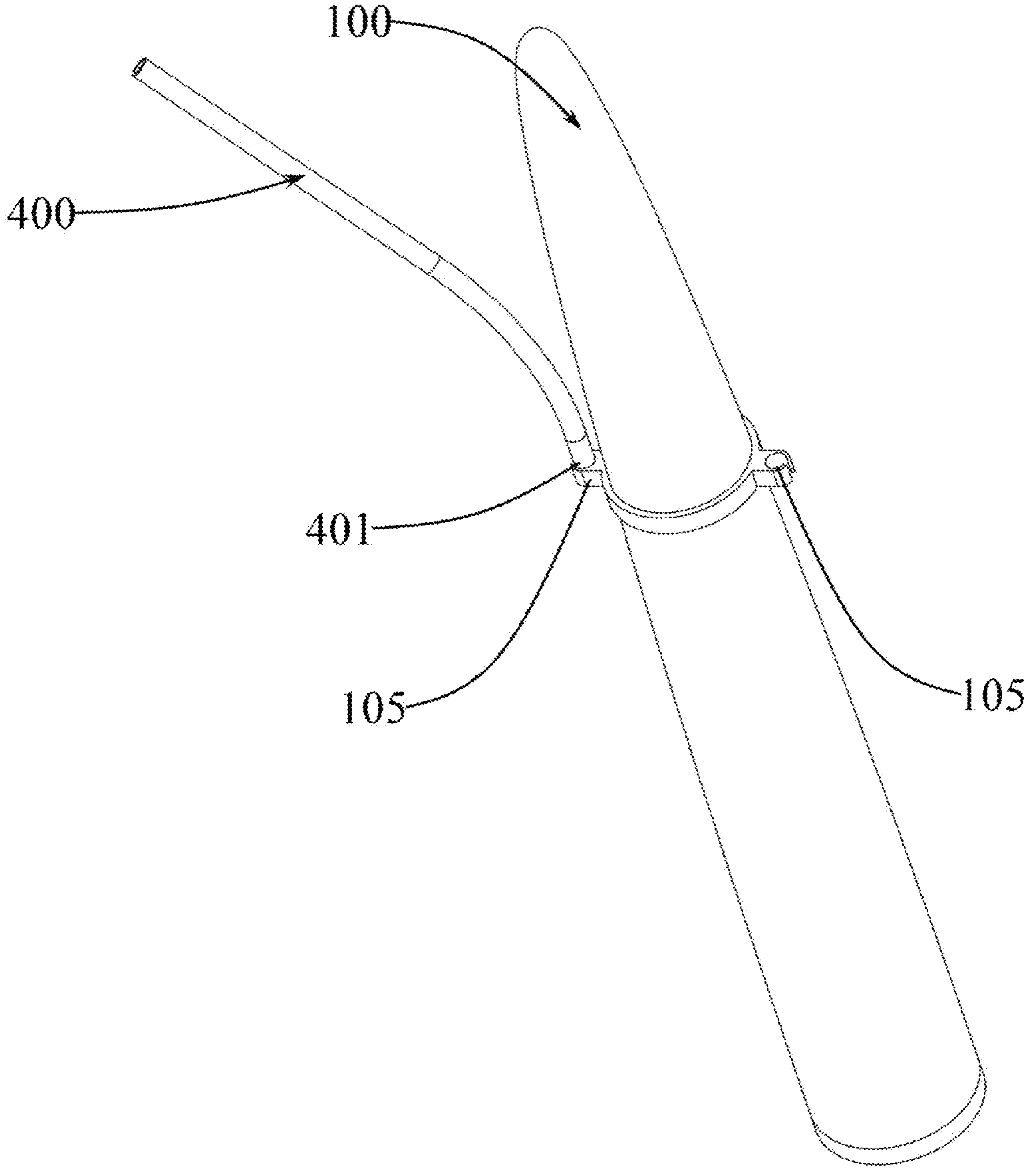
FIG. 21 is an exploded view of the lamp housing and artificial branches according to Embodiment 9 of the present application.

In Embodiment 9, the artificial branches 400 and the lamp housing 100 are installed via clamping. For example, as shown in FIG. 21, the difference from this embodiment is that the third mounting portion 105 is a clamping sleeve with a C-shaped slot fixed on the lamp housing 100, and the fourth mounting portion 401 is the end of the artificial branch 400 that matches the shape of the C-shaped slot. The end of the artificial branch 400 is inserted into the C-shaped slot of the clamping sleeve fixed on the lamp housing 100 to complete the installation.

Figure 22:
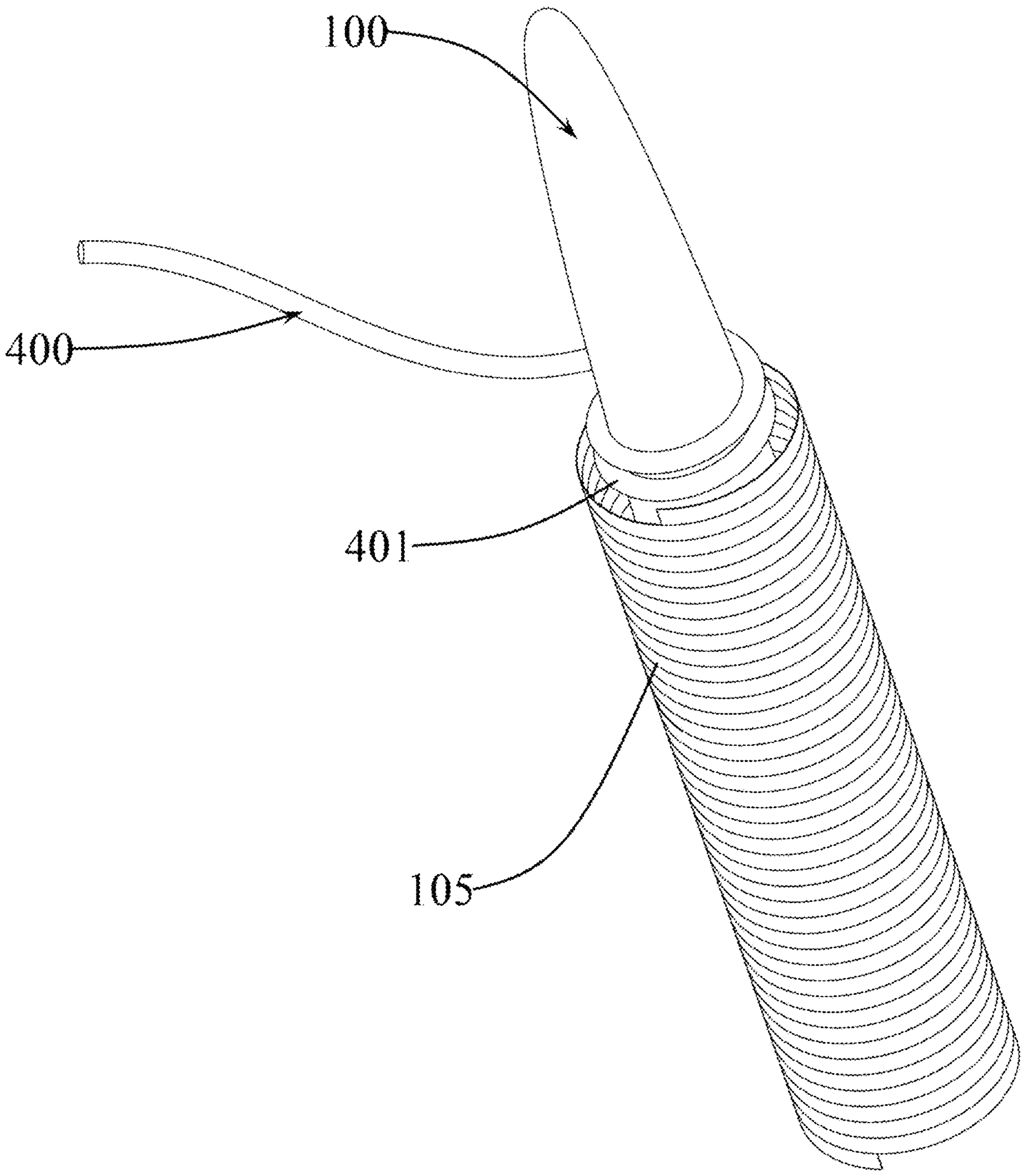
FIG. 22 is an exploded view of the lamp housing and artificial branches according to Embodiment 10 of the present application.

In Embodiment 10, the artificial branches 400 and the lamp housing 100 are installed via wrapping and taping. For example, as shown in FIG. 22, the difference from this embodiment is that the third mounting portion 105 is tape fixed on the lamp housing 100, and the fourth mounting portion 401 is the flexible end of the artificial branch 400 that can be wrapped around the lamp housing 100. The user can wrap the flexible end of the artificial branch 400 around a specific part of the lamp housing 100 and secure it with tape to complete the mechanical connection.

In some embodiments, the artificial branches 400 and the lamp housing 100 are mechanically connected via hooks. For example, hooks are provided on the lamp housing 100, and the end of the artificial branch 400 is designed as a loop or hook structure that matches the hooks. The end of the artificial branch 400 is hung on the hooks of the lamp housing 100, enabling quick installation and disassembly.

In some embodiments, the artificial branches 400 and the lamp housing 100 are integrally connected.

C. Artificial Leaves

In Embodiment 11, to make the decorative tree lamp 10 closer to a real tree in appearance and meet customers' diverse visual needs, as shown in FIGS. 23-28, the decorative tree lamp 10 further includes at least one artificial leaf 500.

Figure 23:
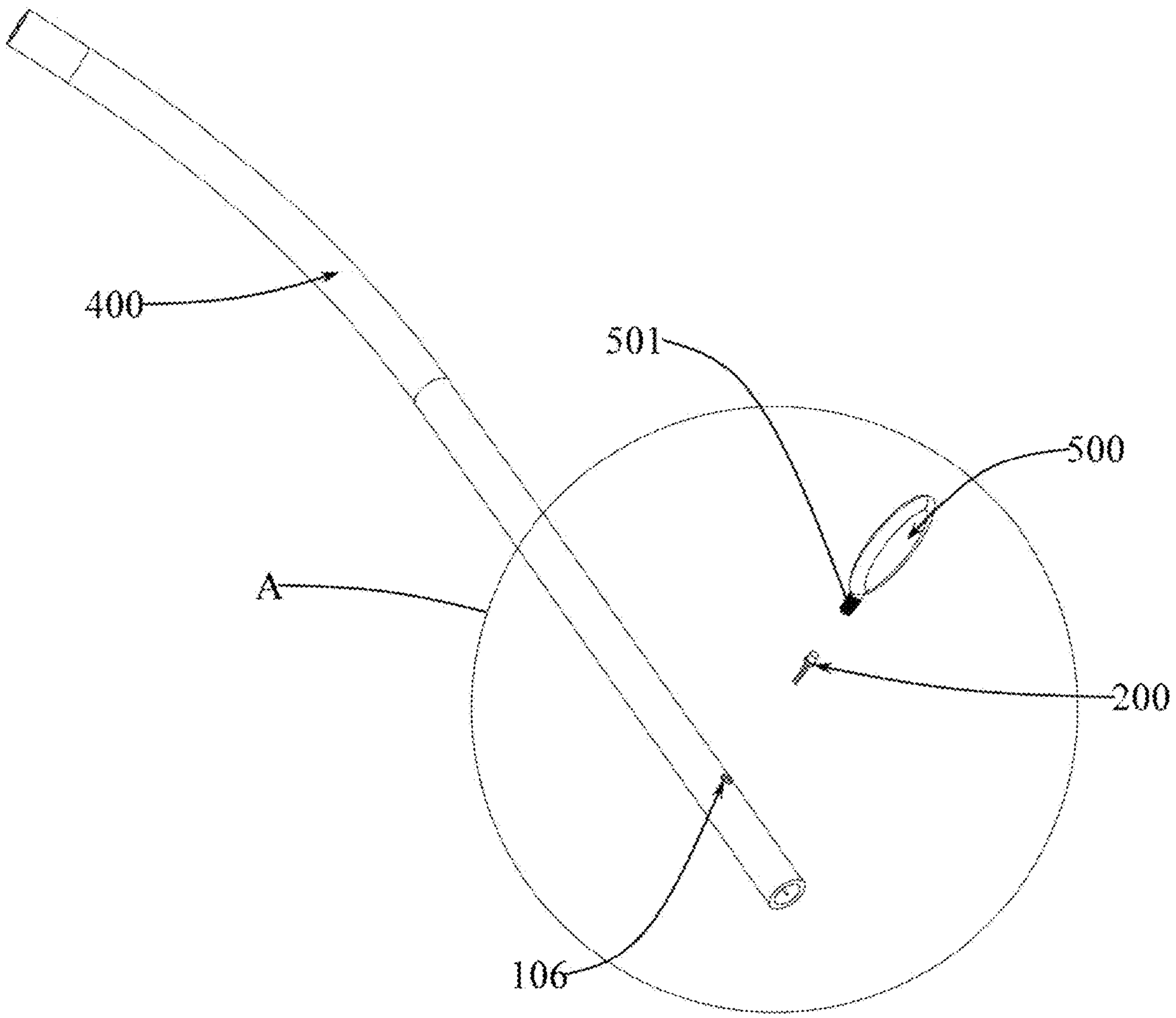
FIG. 23 is an exploded view of the artificial branch and artificial leaf according to Embodiment 11 of the present application.

In Embodiment 11, the artificial leaves 500 are installed on the artificial branches 400. As shown in FIG. 23, the side wall of the artificial branch 400 has a fifth mounting portion 106, and the artificial leaf 500 is correspondingly provided with a sixth mounting portion 501. The fifth mounting portion 106 is detachably connected to the sixth mounting portion 501, allowing the artificial leaf 500 to be detachably connected to the artificial branch 400.

Figure 24:
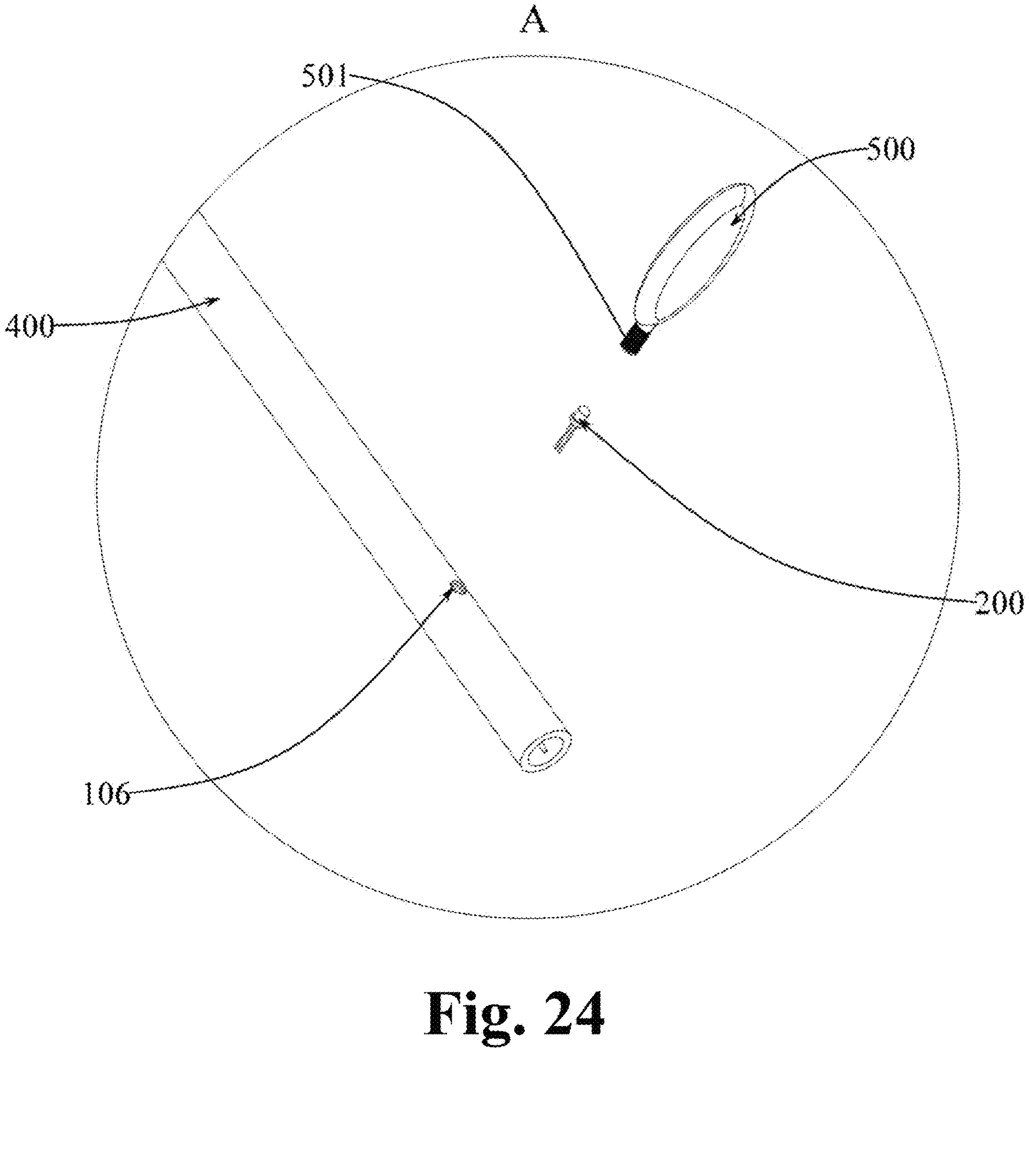
FIG. 24 is an enlarged view of part A in FIG. 23.

In Embodiment 11, the artificial leaves 500 and the artificial branches 400 are installed via a threaded connection. For example, as shown in FIGS. 23-24, the fifth mounting portion 106 is a threaded hole with an internal thread provided on the side wall of the artificial branch 400, and the sixth mounting portion 501 is a threaded post with an external thread provided at the bottom of the artificial leaf 500. The threaded post is aligned with the threaded hole, and the artificial leaf 500 is screwed into the threaded hole of the artificial branch 400 to complete the installation.

Figure 25:
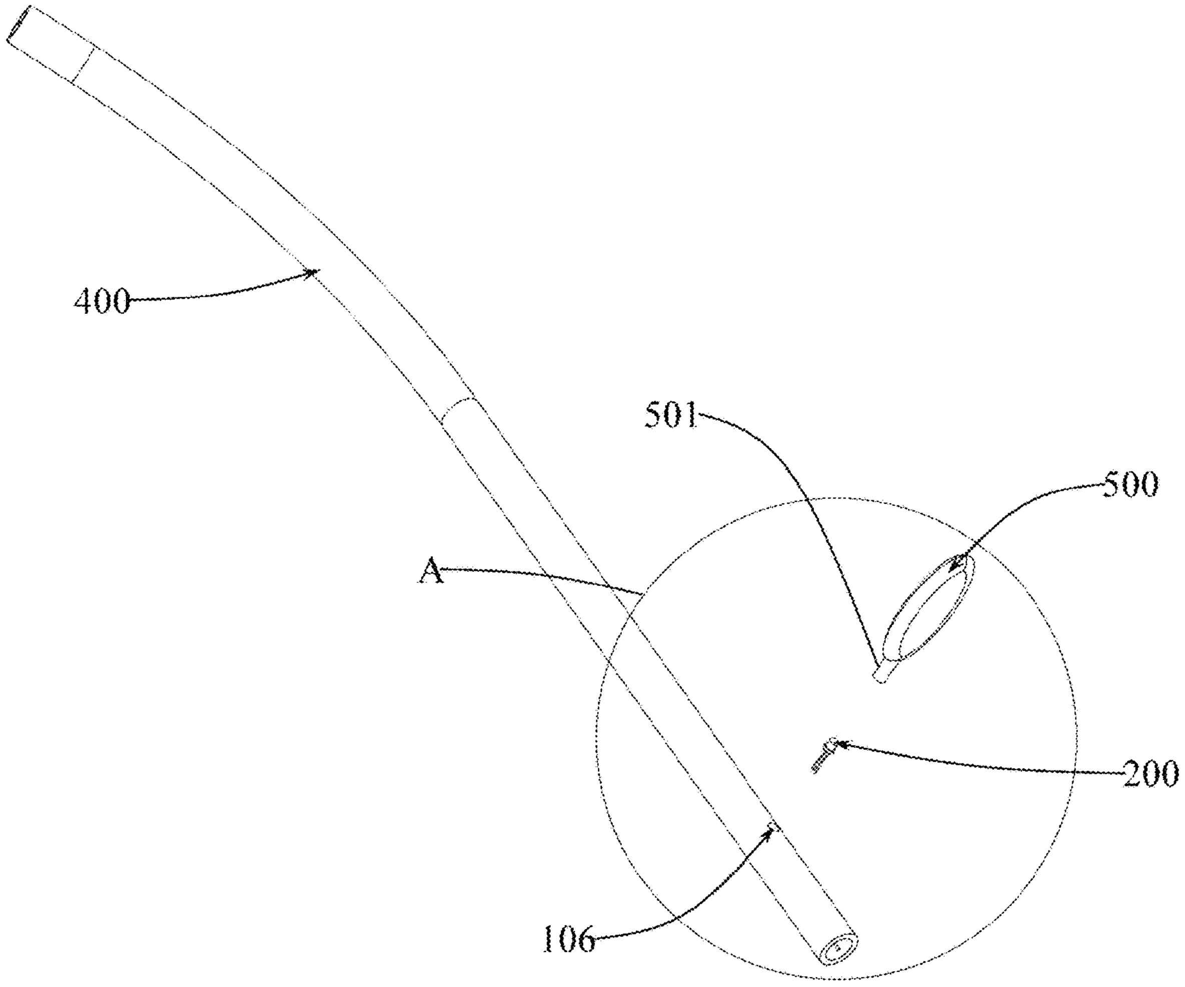
FIG. 25 is an exploded view of the artificial branch and artificial leaf according to Embodiment 12 of the present application.
Figure 26:
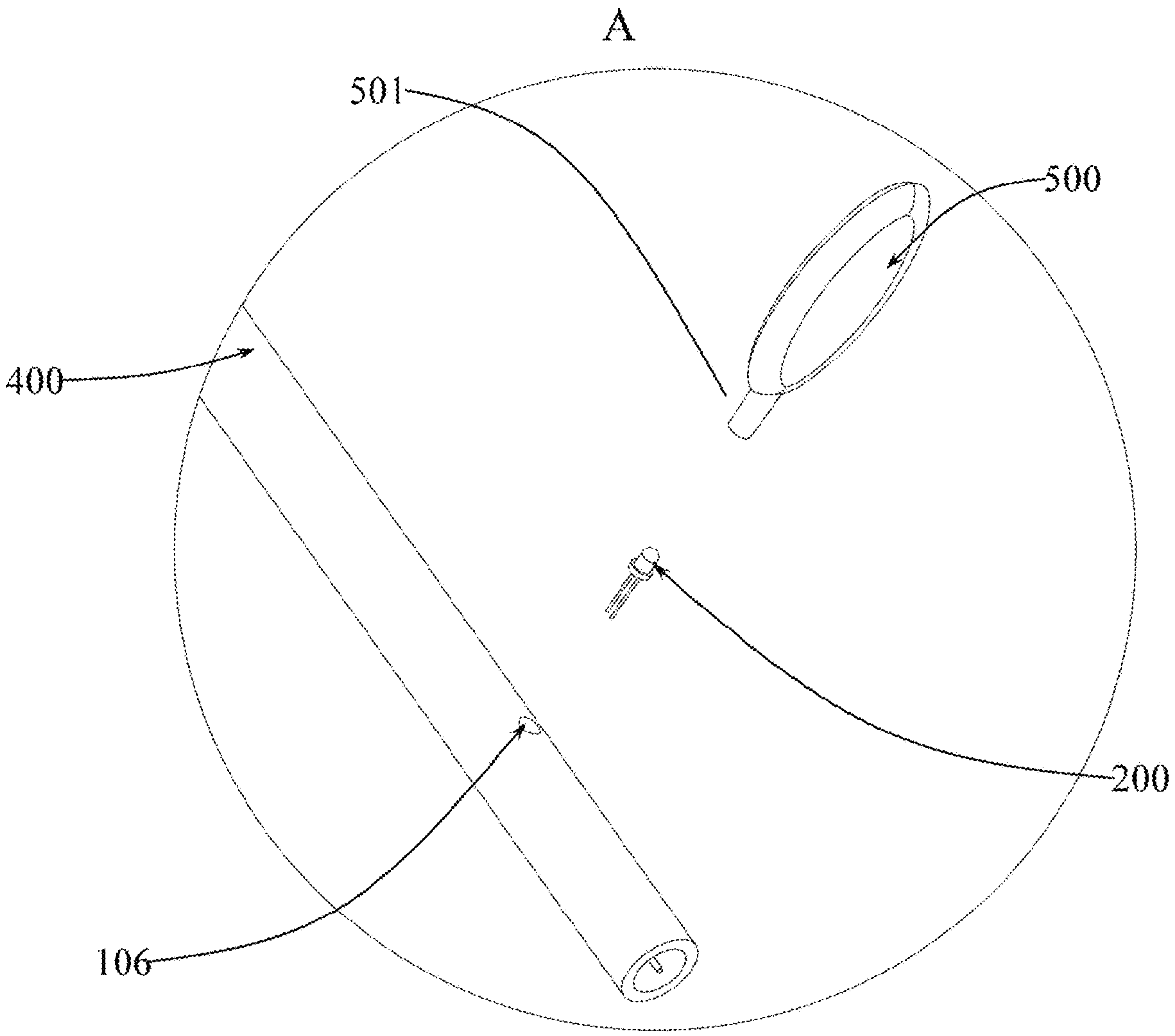
FIG. 26 is an enlarged view of part A in FIG. 25.

In Embodiment 12, the artificial leaves 500 and the artificial branches 400 are installed via an insertion connection. For example, as shown in FIGS. 25-26, the difference from Embodiment 9 is that the fifth mounting portion 106 is an insertion hole provided on the side wall of the artificial branch 400, and the sixth mounting portion 501 is a plug at the bottom of the artificial leaf 500 that matches the insertion hole, which can be shaped like a cylinder, cone, or other forms. The plug is aligned with the insertion hole, and the artificial leaf 500 is pressed firmly to insert the plug into the insertion hole, completing the installation.

Figure 27:
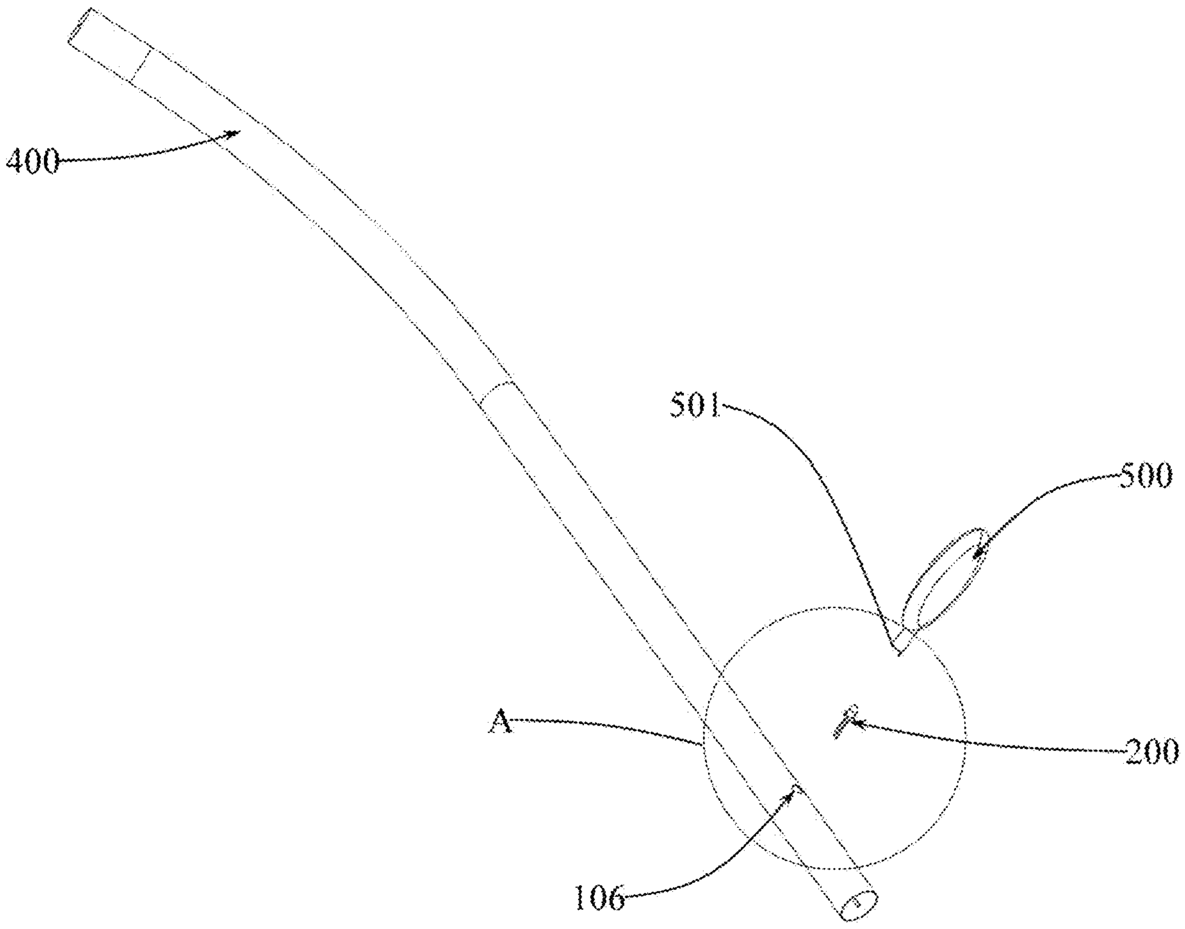
FIG. 27 is an exploded view of the artificial branch and artificial leaf according to Embodiment 13 of the present application.
Figure 28:
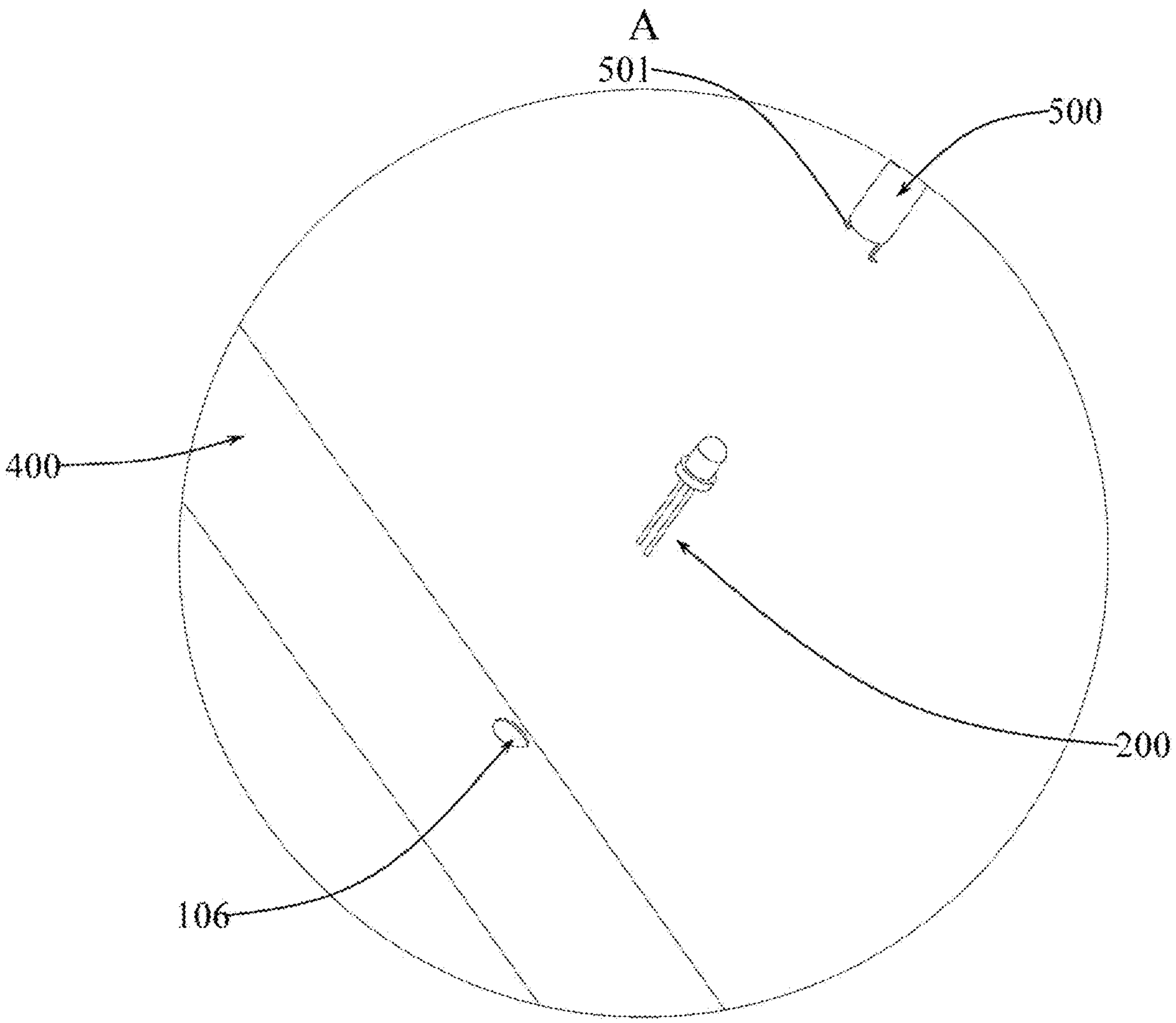
FIG. 28 is an enlarged view of part A in FIG. 27.

In Embodiment 13, the artificial leaves 500 and the artificial branches 400 are installed via a snap-fit connection. For example, as shown in FIGS. 27-28, the difference from Embodiment 9 is that the fifth mounting portion 106 is a snap-fit hole provided on the side wall of the artificial branch 400; the sixth mounting portion 501 is a snap-fit fastener at the bottom of the artificial leaf 500 that matches the snap-fit hole, such as a barb or claw. The fastener is aligned with the snap-fit hole, and the artificial leaf 500 is pressed firmly to snap the fastener into the hole, completing the installation.

In some embodiments, the artificial leaves 500 and the artificial branches 400 are installed via magnetic attraction. For example, the difference from Embodiment 9 is that the fifth mounting portion 105 is a magnet embedded in the side wall of the artificial branch 400, such as a neodymium magnet; the sixth mounting portion 501 is a magnet embedded at the bottom of the artificial leaf 500 with an opposite polarity to the magnet in the side wall of the artificial branch 400. The magnets at the bottom of the artificial leaf 500 and the side wall of the artificial branch 400 are opposite. The magnet at the bottom of the artificial leaf 500 is brought close to the magnet in the side wall of the artificial branch 400, and the magnets attract each other to complete the installation.

In some embodiments, the artificial leaves 500 and the artificial branches 400 are installed via clamping. For example, the difference from Embodiment 9 is that the fifth mounting portion 105 is a clamping sleeve with a C-shaped slot fixed on the artificial branch 400, and the sixth mounting portion 501 is the end of the artificial leaf 500 that matches the shape of the C-shaped slot. The end of the artificial leaf 500 is inserted into the C-shaped slot of the clamping sleeve fixed on the artificial branch 400 to complete the installation.

In some embodiments, the artificial leaves 500 and the artificial branches 400 are installed via bundling and taping. For example, the difference from Embodiment 9 is that the fifth mounting portion 105 is a cable tie or tape wrapped around the artificial branch 400, and the sixth mounting portion 501 is the flexible end of the artificial leaf 500 that can be wrapped around the artificial branch 400. The user can wrap the flexible end of the artificial leaf 500 around a specific part of the artificial branch 400 and secure it with tape to complete the mechanical connection.

In some embodiments, the artificial leaves 500 and the artificial branches 400 are also mechanically connected via hooks. For example, hooks are provided on the artificial branch 400, and the end of the artificial leaf 500 is designed as a loop or hook structure that matches the hooks. The end of the artificial leaf 500 is hung on the hooks of the artificial branch 400, enabling quick installation and disassembly.

In some embodiments, the artificial leaves 500 and the artificial branches 400 are integrally connected.

D. Artificial Fruits

Figure 29:
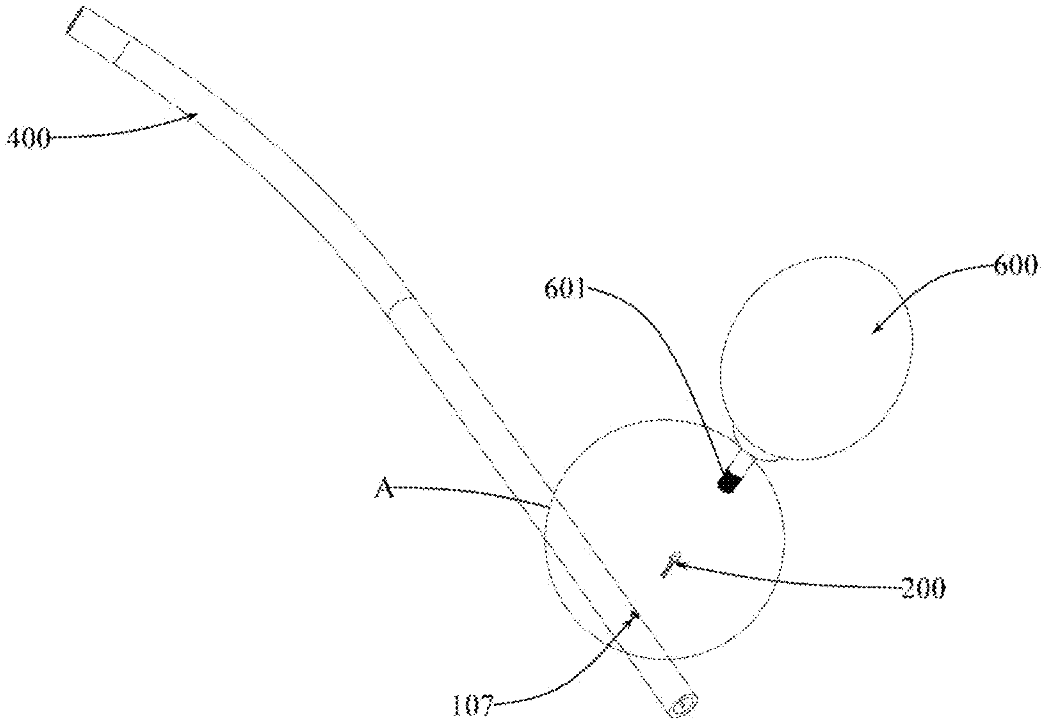
FIG. 29 is an exploded view of the artificial branch and artificial fruit according to Embodiment 14 of the present application.

In Embodiment 14, as shown in FIG. 29, the decorative tree lamp 10 further includes at least one artificial fruit 600 to make it closer to a real tree in appearance and meet customers' diverse visual needs.

Figure 30:
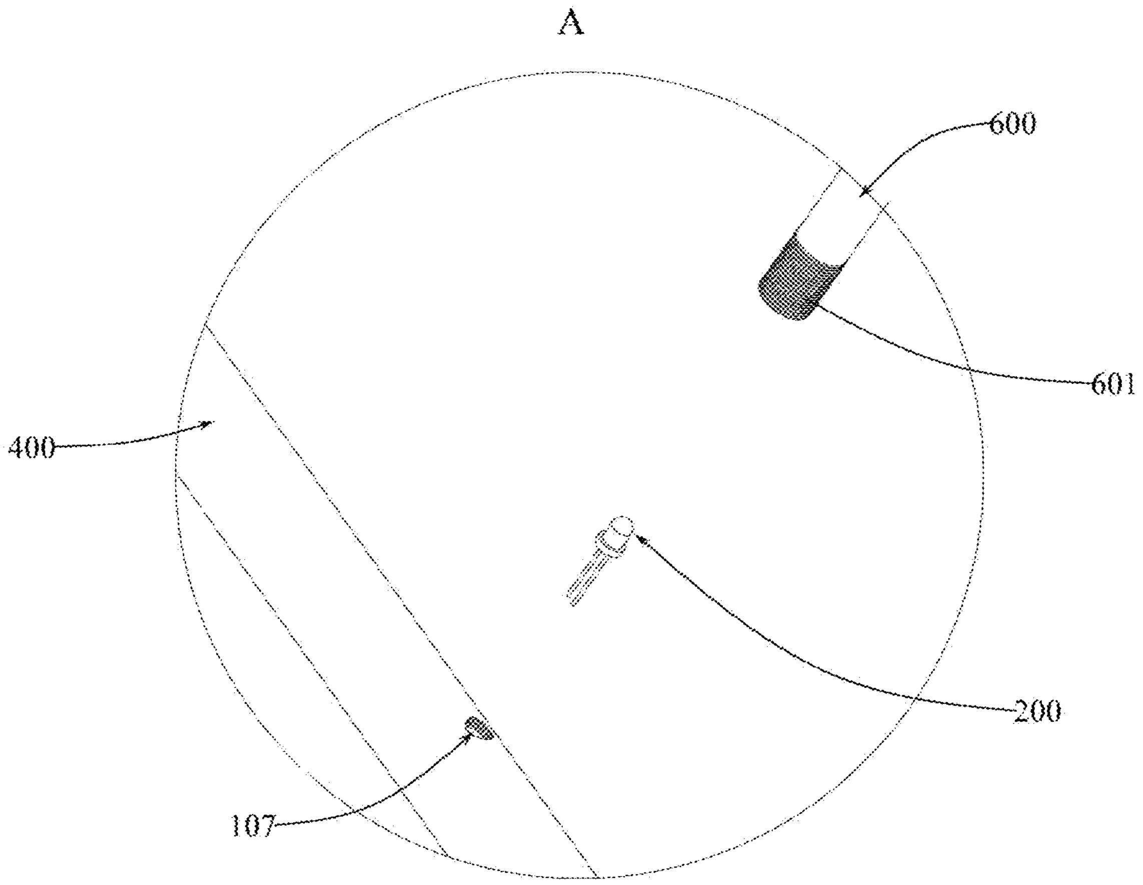
FIG. 30 is an enlarged view of part A in FIG. 29.

In Embodiment 14, the artificial fruit 600 is installed on the artificial branch 400. As shown in FIGS. 29-30, the side wall of the artificial branch 400 has a seventh mounting portion 107, and the artificial fruit 600 is correspondingly provided with an eighth mounting portion 601. The seventh mounting portion 107 is detachably connected to the eighth mounting portion 601, allowing the artificial fruit 600 to be detachably connected to the artificial branch 400.

In Embodiment 14, the artificial fruit 600 is installed on the artificial branches 400 via a threaded connection. For example, as shown in FIGS. 29-30, the seventh mounting portion 107 is a threaded hole with an internal thread provided on the side wall of the artificial branch 400, and the eighth mounting portion 601 is a threaded post with an external thread provided at the bottom of the artificial fruit 600. The threaded post is aligned with the threaded hole, and the artificial fruit 600 is screwed into the threaded hole of the artificial branch 400 to complete the installation.

In some embodiments, the artificial fruit 600 and branch 400 can be connected using the same methods as the branch 400 and leaves 500, including insertion, snap-fit, magnetic attachment, clamping, bundling, hooking, or integrated construction.

E. Light-Emitting Body

In this embodiment, the light-emitting body 200 emits light when energized, such as an incandescent lamp or LED bead.

Figure 31:
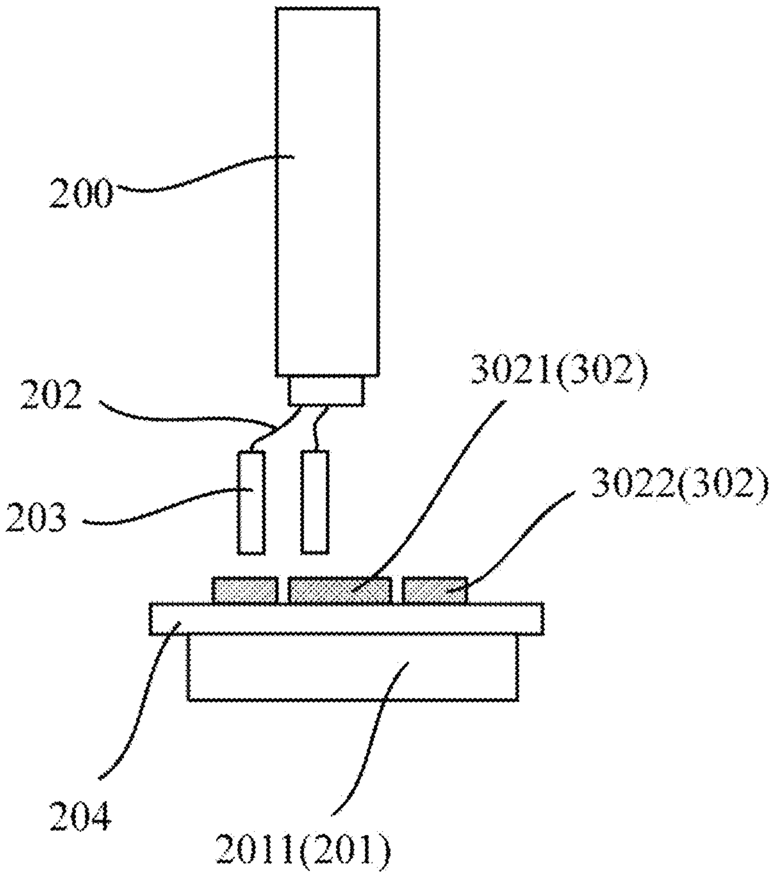
FIG. 31 is a schematic diagram of the structural principle of the light-emitting body according to an embodiment of the present application.

In this embodiment, the decorative tree lamp 10 further includes a power supply unit 201, which is installed on the base 300 and selectively electrically connected to the light-emitting body 200 to power it, as shown in FIG. 31.

Figure 32:
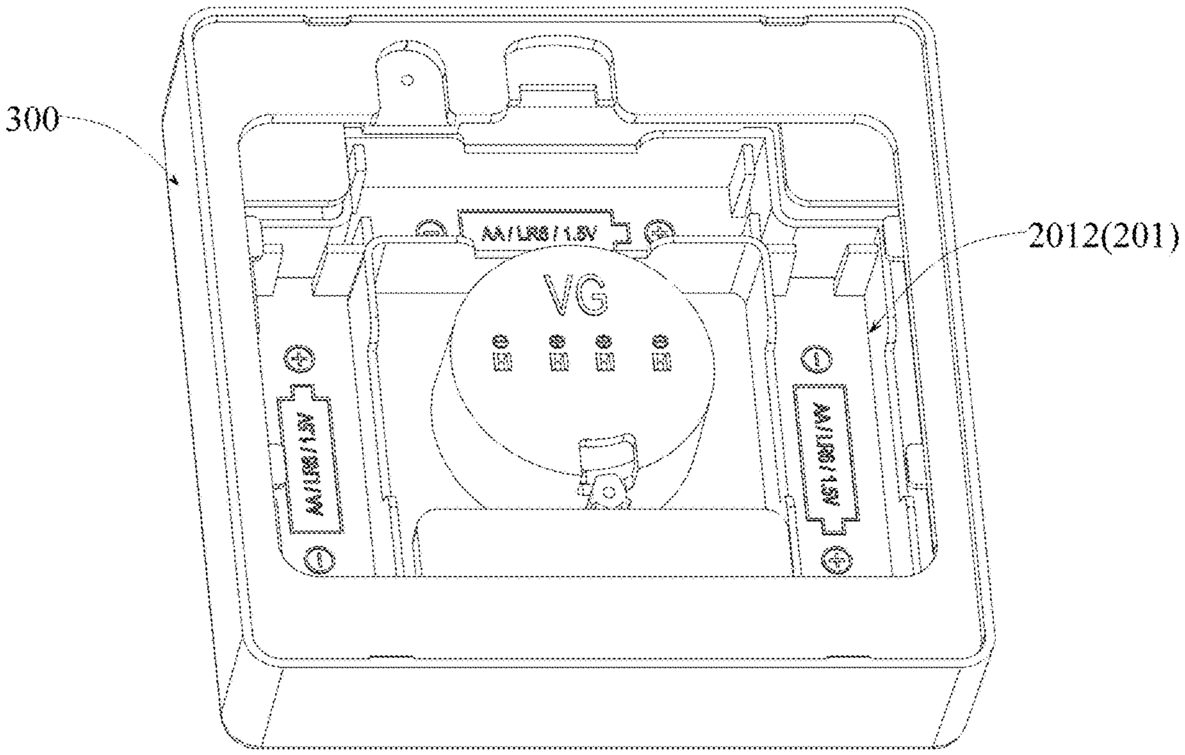
FIG. 32 is a schematic diagram of the base with the external cover removed according to an embodiment of the present application.

In this embodiment, the light-emitting body 200 is powered by a battery. For example, as shown in FIGS. 31-32, the light-emitting body 300 is an LED bead, and the power supply unit 301 includes a battery 2011, a current-limiting resistor, and a battery compartment 2012. The LED bead can be a high-brightness white LED bead, such as the 2835 model, with a working voltage of 3.0-3.4V and a working current of 20 mA. For example, the current-limiting resistor can be a carbon film resistor with a resistance of 100Q, used to limit the LED current and prevent burnout. For example, the battery compartment 2012 can be a standard AA battery holder with a positive output voltage of 1.5V and a negative output as ground. The anode of the LED bead is soldered to the positive terminal of the battery compartment 2012, the cathode of the LED bead is soldered to one end of the current-limiting resistor, and the other end of the current-limiting resistor is soldered to the negative terminal of the battery compartment 2012. This way, when the battery 2011 is inserted into the battery compartment 2012, it provides a 1.5V DC voltage to the LED bead. The LED bead emits light under the voltage, and the current-limiting resistor ensures the current is regulated, allowing the LED to function correctly. Multiple batteries can be connected in series if a higher voltage is required.

Figure 33:
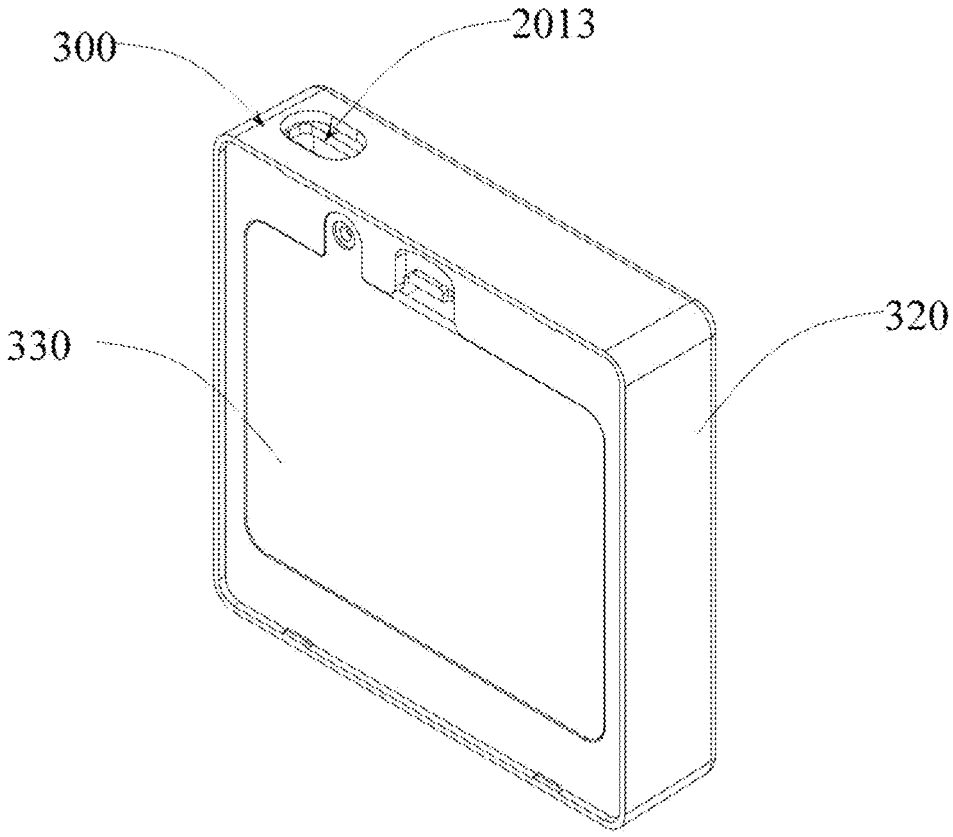
FIG. 33 is a schematic diagram of the overall structure of the base according to Embodiment 15 of the present application.

In Embodiment 15, the light-emitting body 200 is powered by an external power source. For example, as shown in FIGS. 31 and 33, the difference from this embodiment is that the light-emitting body 200 is an LED bead, and the power supply unit 201 includes a current-limiting resistor and a USB port 2013. The LED bead can be a high-brightness white LED bead, such as the 2835 model, with a working voltage of 3.0-3.4V and a working current of 20 mA. For example, the current-limiting resistor can be a carbon film resistor with a resistance of 100Q, used to limit the LED current and prevent burnout. For example, the USB port 2013 can be a standard USB-A port, with its VCC pin outputting a voltage of +5V and the GND pin serving as ground. The anode of the LED bead is soldered to the VCC pin of the USB port 2013, the cathode of the LED bead is soldered to one end of the current-limiting resistor, and the other end of the current-limiting resistor is soldered to the GND pin of the USB port 2013. In this way, by connecting the USB port 2013 to the USB interface of a device such as a computer or power bank, a 5V DC voltage can be provided to the LED bead. The LED bead emits light under the voltage, and the current-limiting resistor ensures the current is regulated, allowing the LED to function correctly.

Figure 34:
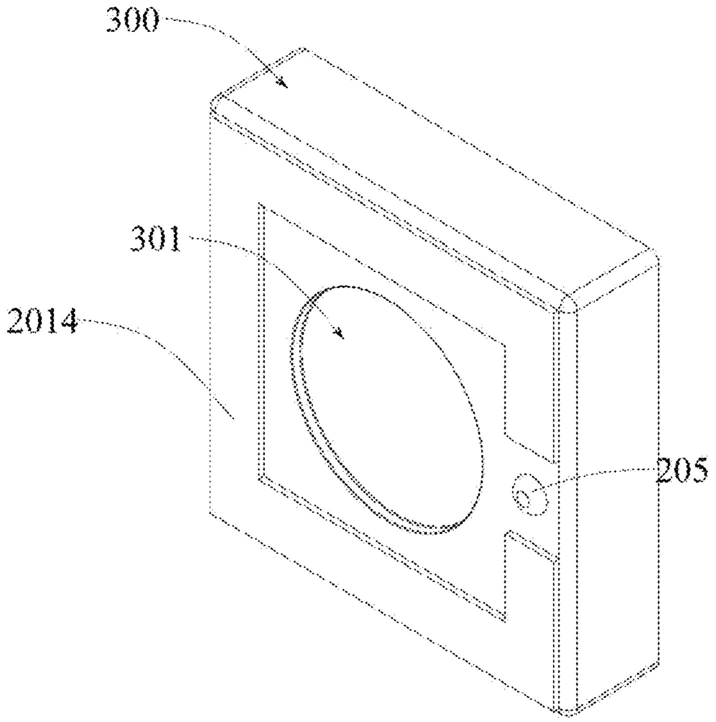
FIG. 34 is a schematic diagram of the overall structure of the base according to Embodiment 16 of the present application.
Figure 35:
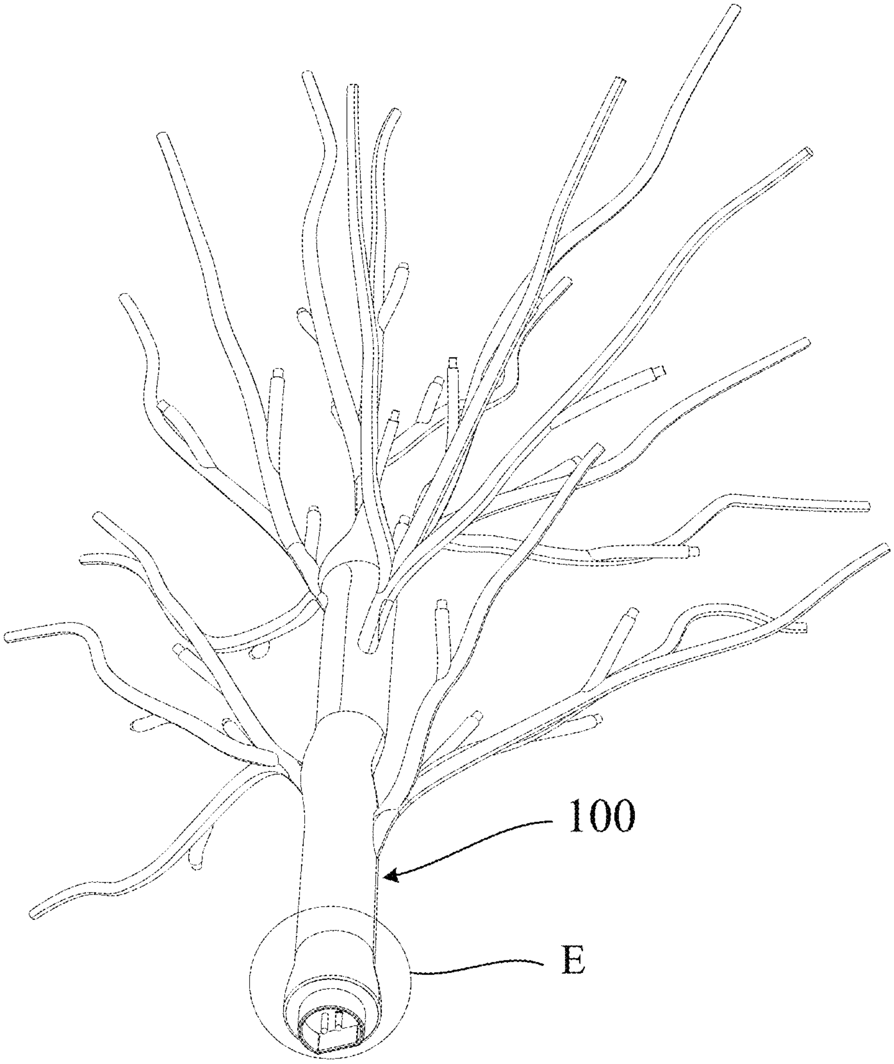
FIG. 35 is a schematic diagram of the assembly structure of the lamp housing and artificial branches according to Embodiment 5 of the present application.

In Embodiment 16, the light-emitting body 200 is powered by solar energy. For example, as shown in FIGS. 31 and 34, the difference from this embodiment is that the power supply unit 201 includes a solar panel 2014, a charging management circuit, and a lithium battery. For example, the solar panel 2014 can be a monocrystalline silicon solar panel with an output power of 1 W, an output voltage of 5V, and an output current of 200 mA. For example, the charging management circuit can be a TP4056 lithium-battery charging-management chip used to control the solar panel 2014 charging the lithium battery. For example, the lithium battery can be a 3.7V lithium battery with a capacity of 1000 mAh, used to store electrical energy and power the LED bead. The positive terminal of the solar panel 2014 is connected to the VIN pin of the charging management circuit, the negative terminal is connected to the GND pin, the positive terminal of the lithium battery is connected to the BAT+ pin of the charging management circuit, and the negative terminal is connected to the BAT− pin. The OUT+ pin of the charging management circuit is connected to the anode of the LED bead, and the OUT− pin is connected to one end of the current-limiting resistor. The other end of the current-limiting resistor is connected to the cathode of the LED bead. This way, during the day, the solar panel 2014 converts light energy into electrical energy and charges the lithium battery through the charging management circuit. At night, the lithium battery powers the LED bead through the charging management circuit, causing it to emit light.

In Embodiment 4, the light-emitting body 200 is powered by wireless charging. For example, as shown in FIGS. 12 and 31, the difference from this embodiment is that the power supply unit 201 includes a wireless-charging receiving coil 2015, a wireless-charging transmitting coil 2016, a receiving-end insulating cover 2017, a transmitting-end insulating cover 2018, a rectifier-filter circuit, and a lithium battery. The wireless-charging receiving coil 2015 is located on the side of the first mounting portion 104 at the bottom of the lamp housing 100 that engages with the second mounting portion 301. The rectifier-filter circuit and the lithium battery are inside the lamp housing 100. The wireless-charging transmitting coil 2016 is located on the side of the second mounting portion 301 on the base 300 that engages with the first mounting portion 104. The receiving-end insulating cover 2017 and the transmitting-end insulating cover 2018 cover the wireless-charging receiving coil 2015 and the wireless-charging transmitting coil 2016, respectively, to prevent electrical conduction between them. For example, the LED bead can be a high-brightness white LED bead, such as the 2835 model, with a working voltage of 3.0-3.4V and a working current of 20 mA. For example, the current-limiting resistor can be a carbon film resistor with a resistance of 100Ω, used to limit the LED current and prevent burnout. The wireless-charging receiving coil 2015 can be, for example, a wireless-charging receiving coil with a diameter of 20 mm to receive electromagnetic waves emitted by the wireless-charging transmitting coil 2016 and convert them into electrical energy. For example, the rectifier-filter circuit can be a bridge rectifier circuit combined with an electrolytic capacitor, used to convert the received alternating current into direct current and filter out noise. For example, the lithium battery can be a 3.7V lithium battery with a capacity of 1000 mAh, used to store electrical energy and power the LED bead. The wireless-charging receiving coil 2015 is connected to the input of the rectifier-filter circuit, the output of the rectifier-filter circuit is connected to the positive terminal of the lithium battery, the negative terminal of the lithium battery is connected to the cathode of the LED bead, and the anode of the LED bead is connected in series with the current-limiting resistor to the positive terminal of the lithium battery. In this way, when the first mounting portion 104 engages with the second mounting portion 301, the wireless-charging transmitting coil 2016, connected to an external power source, emits electromagnetic waves. The wireless-charging receiving coil 2015 receives the electromagnetic waves and converts them into alternating current. The rectifier-filter circuit converts the alternating current into direct current and charges the lithium battery. The lithium battery then powers the LED bead, causing it to emit light.

In this embodiment, to achieve electrical connections between the light-emitting body 200, the power supply unit 400, and the circuit board 420, as shown in FIGS. 5-7 and 31, the decorative tree lamp 10 further includes wires 202, a first conductive structure 203, and a second conductive structure 302. The light-emitting body 200 is electrically connected to the first conductive structure 203 through the wires 202. The first conductive structure 203 is located on the side of the first mounting portion 104, which engages with the second mounting portion 301. The power supply unit 201 is electrically connected to the second conductive structure 302 through the wires 202. The second conductive structure 302 is located on the side of the second mounting portion 301 that engages with the first mounting portion 104. When the first mounting portion 104 engages with the second mounting portion 301, the first conductive structure 203 is electrically connected to the second conductive structure 302. When the first mounting portion 104 and the second mounting portion 301 are separated, the first conductive structure 203 is disconnected from the second conductive structure 302.

In this embodiment, the materials of the first conductive structure 203 and the second conductive structure 302 are conductors. Common metal conductors such as copper, aluminum, and nickel can be selected for cost considerations.

In this embodiment, the first conductive structure 203 and the second conductive structure 302 are a contact and a contact plate, respectively. For example, as shown in FIGS. 5-7 and 31, the first conductive structure 203 includes a first contact 2031 and a second contact 2032, and the second conductive structure 302 includes a first contact plate 3021 and a second contact plate 3022. The first contact 2031 and the second contact 2032 are electrically connected to the first contact plate 3021 and the second contact plate 3022, respectively.

In this embodiment, to enable the first conductive structure 203 to selectively rotate around a rotation axis relative to the second conductive structure 302, as shown in FIGS. 5-7 and 31, the first contact plate 3021 is a circular contact plate, and the second contact plate 3022 is an annular contact plate surrounding the first contact plate 2041. The annular and circular contact plates are concentric, with their common center on the rotation axis. The annular contact plate and the circular contact plate are spaced apart. The first contact 2031 corresponds to the circular contact plate, and the second contact 2032 corresponds to the annular contact plate. In this way, when the first conductive structure 203 rotates, the first contact 2031 always remains in contact with the circular contact plate, and the second contact 2032 always remains in contact with the annular contact plate.

In some embodiments, the number of contacts can also be 1, 3, 4, etc., but is not limited to these numbers.

In some embodiments, the common center of the annular contact plate and the circular contact plate may not be on the rotation axis.

In some embodiments, the contact can be a spring contact to ensure a more stable electrical connection.

In Embodiment 5, the first conductive structure 203 and the second conductive structure 302 are a plug and a socket, respectively. For example, as shown in FIGS. 35-38, the difference from this embodiment is that the first conductive structure 203 includes a plug 2033, and the second conductive structure 302 includes a socket 3023. The socket 3023 has contacts or contact plates inside its insertion hole 3024. The plug 2033 is inserted into the insertion hole 3024 to contact the contacts or contact plates, achieving an electrical connection.

In Embodiment 5, as shown in FIG. 36, plug 2033 is cylindrical, which provides a larger conductive contact area between it and the contacts or contact plates inside the insertion hole 3024.

In some embodiments, the first conductive structure 203 and the second conductive structure 302 are a contact and a contact plate, respectively. For example, the first conductive structure 203 is a contact, and the second conductive structure 302 is a contact plate. The lamp housing 100 and the base 300 achieve a detachable electrical connection through the contact between the contact and the contact plate. When the lamp housing 100 is installed on the base 300, the contact and the contact plate are in close contact to achieve an electrical connection. When the lamp housing 100 is removed from the base 300, the contact and the contact plate separate, and the electrical connection is disconnected.

In Embodiment 4, the first conductive structure 203 and the second conductive structure 204 are magnetic contacts. For example, as shown in FIG. 12, the difference from this embodiment is that the lamp housing 100 and the base 300 achieve a detachable electrical connection through the magnetic attraction between the magnetic contacts. When the lamp housing 100 is brought close to the base 300, the magnetic contacts attract each other and make close contact, forming an electrical connection. When the lamp housing 100 is moved away from the base 300, the magnetic contacts separate, and the electrical connection is disconnected. The magnetic contacts can be made of strong magnetic materials (such as neodymium magnets) to ensure connection stability. In this way, the connection between the first conductive structure 203 and the second conductive structure 204 is quick, does not require precise alignment, is more convenient and stable, and facilitates disassembly and maintenance.

In some embodiments, the first conductive structure 203 and the second conductive structure 204 are an insulation displacement connector (IDC) and an insulated wire, respectively. The IDC pierces the insulation layer to achieve electrical connection without additional wiring.

In some embodiments, the first conductive structure 203 is a conductive spring plate, and the second conductive structure 204 is a contact or contact plate. The elastic force of the conductive spring plate ensures a long-term stable and effective electrical connection with the contact or contact plate.

In some embodiments, the first conductive structure 203 and the second conductive structure 204 are male and female interfaces integrated with multiple contacts, respectively. The male and female interfaces achieve multi-contact electrical connections. The interfaces can be, for example, USB interfaces, HDMI interfaces, BNC interfaces, SMA interfaces, MagSafe interfaces, or magnetic charging interfaces.

In this embodiment, to control the illumination of the light-emitting body 200, as shown in FIGS. 2-3 and 31, the decorative tree lamp 10 further includes a circuit board 204. The circuit board 204 is installed in the base 300, which is electrically connected to the second conductive structure 302 through the wires 202, thereby electrically connecting to the light-emitting body 200 through the first conductive structure 203. In this way, the circuit board 204 controls the illumination of the light-emitting body 200.

In this embodiment, the illumination of the light-emitting body 200 is controlled by the control switch 205. For example, as shown in FIGS. 1-3 and 31, the circuit board 204 is equipped with a control switch 205, which is connected in series in the power supply circuit of the light-emitting body 200. The control switch 205 can be a toggle, push-button, or touch switch, which controls the illumination state of the light-emitting body 200. When the control switch 205 is closed, the power supply circuit is connected, and the light-emitting body 200 is energized to emit light. When the control switch 205 opens, the power supply circuit is disconnected, and the light-emitting body 200 is de-energized and turned off. By operating the control switch 205, users can flexibly control the illumination and extinguishing of the light-emitting body 200, enabling convenient management of the lighting function.

In some embodiments, the circuit board 204 has a PWM signal generator, a MOSFET driver circuit, and a light-emitting body. The PWM signal generator can be formed using an NE555 timer chip to generate a PWM signal with adjustable frequency and duty cycle. The MOSFET driver circuit, which includes an N-channel MOSFET and resistors, is used to amplify the PWM signal and drive the light-emitting body. The light-emitting body can be a high-brightness white LED bead. The VCC pin of the NE555 timer chip is connected to the positive terminal of the power supply, the GND pin is connected to the negative terminal of the power supply, the output pin of the NE555 timer chip is connected to the gate of the MOSFET, the drain of the MOSFET is connected to the anode of the light-emitting body, the source is connected to the negative terminal of the power supply, and the cathode of the light-emitting body is connected to the positive terminal of the power supply. The NE555 timer chip generates a PWM signal to control the MOSFET's conduction and cutoff. When the MOSFET is cut off, the current is interrupted, and the light-emitting body turns off. By adjusting the PWM signal's duty cycle, the light-emitting body's average current can be controlled, enabling brightness adjustment.

In some embodiments, the circuit board 204 is equipped with an analog dimming circuit, a MOSFET driver circuit, and a light-emitting body. The analog dimming circuit can use, for example, a potentiometer to adjust the current. One end of the potentiometer is connected to the positive terminal of the power supply, the other end is connected to the negative terminal of the power supply, and the sliding terminal of the potentiometer is connected to the gate of the MOSFET. The drain of the MOSFET is connected to the anode of the light-emitting body, the source is connected to the negative terminal of the power supply, and the cathode of the light-emitting body is connected to the positive terminal of the power supply. By adjusting the potentiometer, the voltage at the gate of the MOSFET is changed, controlling the MOSFET's conduction level. The MOSFET's conduction level determines the current flowing through the light-emitting body, enabling brightness adjustment.

In some embodiments, the circuit board 204 has a microcontroller, a MOSFET driver circuit, and a light-emitting body. The microcontroller can be an STM32 series microcontroller as the control core, used to generate PWM signals and control other peripherals. The MOSFET driver circuit, which includes an N-channel MOSFET and resistors, is used to amplify the PWM signal and drive the light-emitting body. The light-emitting body can be a high-brightness white LED bead. The PWM output pin of the microcontroller is connected to the gate of the MOSFET, the drain of the MOSFET is connected to the anode of the light-emitting body, the source is connected to the negative terminal of the power supply, and the cathode of the light-emitting body is connected to the positive terminal of the power supply. The microcontroller generates PWM signals based on preset programs to control the MOSFET's conduction and cutoff. By changing the PWM signal's duty cycle, the light-emitting body's average current can be controlled, enabling brightness adjustment. The microcontroller can also implement other functions like timed switching, brightness memory, and scene modes.

In this embodiment, the light-emitting body 200 is located inside the lamp housing 100. For example, as shown in FIG. 2, the light-emitting body 200 is installed in the accommodating cavity of the lamp housing 100 and located at the bottom of the lamp housing 100. In this case, the material of the lamp housing 100 is semi-transparent or fully transparent, such as acrylic, glass, polycarbonate, or resin. This way achieves the visual effect of the tree body emitting light.

In some embodiments, the light-emitting body 200 is located on the outer side wall of the lamp housing 100. For example, the light-emitting body 200 is a light string wrapped around the outer side wall of the lamp housing 100. In this case, the material of the lamp housing 100 is opaque. This way also achieves the visual effect of the tree body emitting light.

In some embodiments, the light-emitting body 200 is inside the cavity of the artificial branch 400. In this case, the material of the artificial branch 400 is semi-transparent or fully transparent, such as acrylic, glass, polycarbonate, or resin. The light-emitting body 200 is electrically connected to the first conductive structure 203 through the wire 202 to enable the power supply unit 201 to power the light-emitting body 200. Wire holes can be provided on structures (such as the lamp housing 100 or the artificial leaf 500) that block the path of wire 202, allowing wire 202 to pass smoothly and connect to the first conductive structure 203. In detail, the wire holes can be provided on the third mounting portion 105 of the lamp housing 100, the fourth mounting portion 401 of the artificial branch 400, or the sixth mounting portion 501 of the artificial leaf 500. The diameter of the wire holes matches the outer diameter of wire 202, ensuring that the wire 202 can pass through smoothly and maintain a stable electrical connection. The inner wall of the wire holes can be provided with an insulating layer to prevent short circuits or wear between the wire 202 and the structure. In this way, the visual effect of the branches emitting light can be achieved.

In some embodiments, the light-emitting body 200 is located on the outer side wall of the artificial branch 400. For example, the light-emitting body 200 is a light string wrapped around the outer side wall of the artificial branch 400. In this case, the material of the artificial branch 400 is opaque. This way also achieves the visual effect of the branches emitting light.

In some embodiments, the light-emitting body 200 is inside the cavity of the artificial leaf 500. For example, as shown in FIGS. 23-28, the artificial leaf 500 is a hollow structure with an inner cavity, and the light-emitting body 200 is an LED bead located inside the cavity. In this case, the material of the artificial leaf 500 is semi-transparent or fully transparent, such as acrylic, glass, polycarbonate, or resin. The light-emitting body 200 is electrically connected to the first conductive structure 203 through the wire 202 to enable the power supply unit 201 to power the light-emitting body 200. Wire holes can also be provided on structures (such as the lamp housing 100 or the artificial branch 400) that block the path of wire 202, allowing wire 202 to pass smoothly and connect to the first conductive structure 203. In this way, the visual effect of the leaves emitting light can be achieved.

In some embodiments, the light-emitting body 200 is an LED lamp with a leaf-shaped housing. This way also achieves the visual effect of the leaves emitting light.

In some embodiments, the light-emitting body 200 is inside the cavity of the artificial fruit 600. For example, as shown in FIGS. 29-30, the artificial fruit 600 is a hollow structure with an inner cavity, and the light-emitting body 200 is an LED bead inside the cavity. In this case, the material of the artificial fruit 600 is semi-transparent or fully transparent, such as acrylic, glass, polycarbonate, or resin. The light-emitting body 200 is electrically connected to the first conductive structure 203 through the wire 202 to enable the power supply unit 201 to power the light-emitting body 200. Wire holes can also be provided on structures (such as the lamp housing 100 or the artificial branch 400) that block the path of wire 202, allowing wire 202 to pass smoothly and connect to the first conductive structure 203. In this way, the visual effect of the fruits emitting light can be achieved.

In some embodiments, the light-emitting body 200 is an LED lamp with a fruit-shaped housing. This way also achieves the visual effect of the fruits emitting light.

Figure 39:
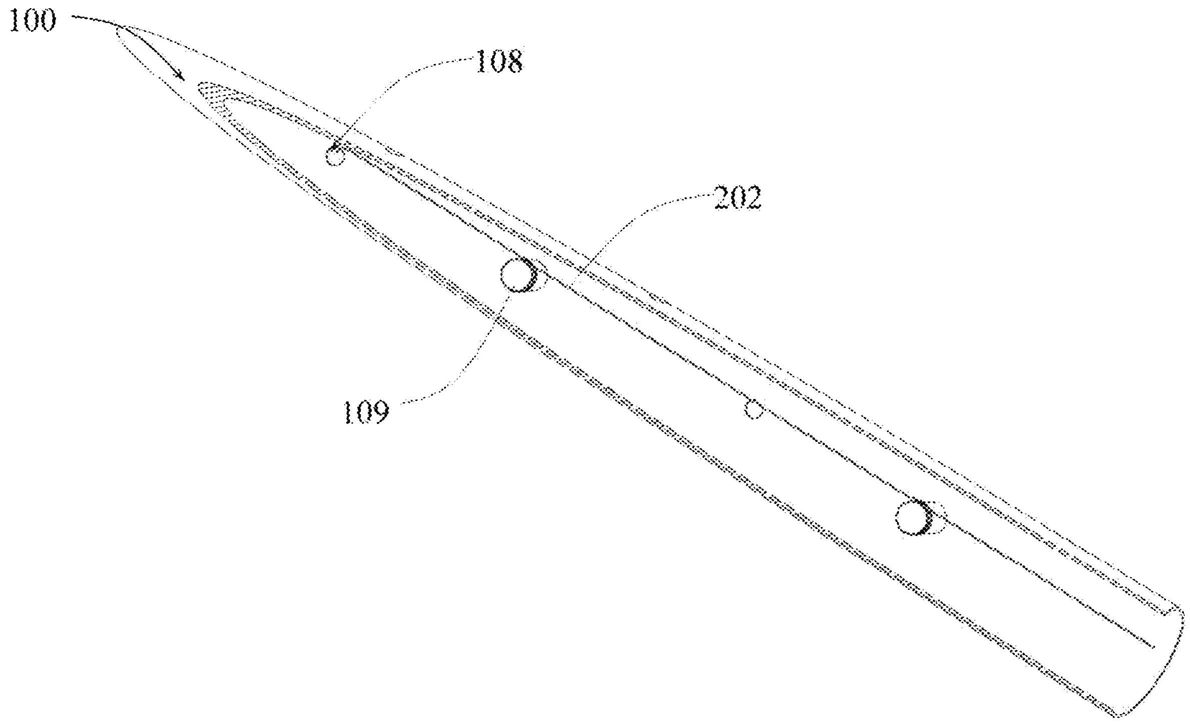
FIG. 39 is a cross-sectional view of the lamp housing according to an example of Embodiment 17 of the present application.
Figure 40:
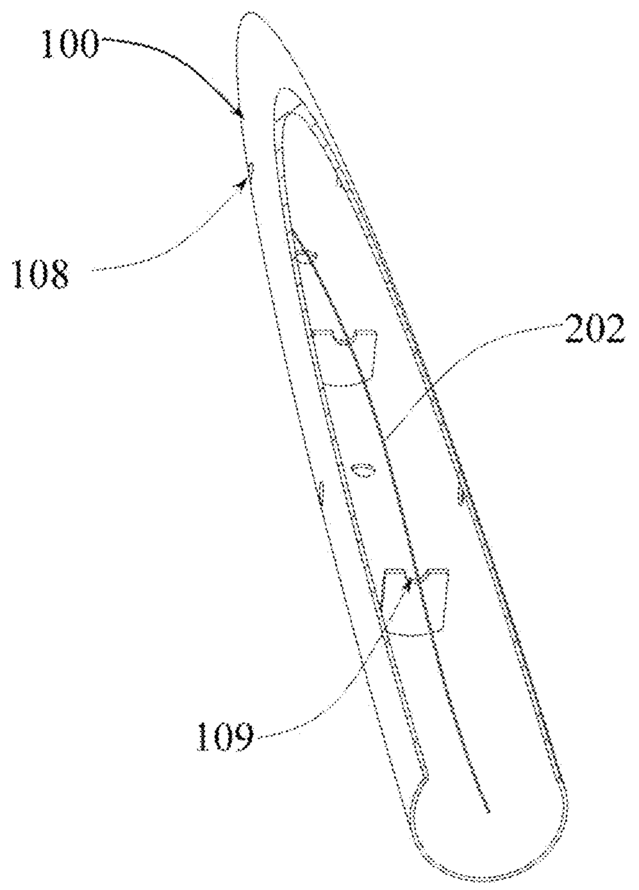
FIG. 40 is a cross-sectional view of the lamp housing according to another example of Embodiment 17 of the present application.

In Embodiment 17, to guide the wire 202 of the light-emitting body 200 located outside the lamp housing 100 into the interior of the lamp housing 100, as shown in FIGS. 39-40, the difference from this embodiment is that the lamp housing 100 further includes a wiring outlet 108 and a wire-fixing structure 109. The wire 202 passes through the wiring outlet 108 from the light-emitting body 200 outside the lamp housing 100 and enters the lamp housing 100. The wire-fixing structure 109 secures wire 202 inside the lamp housing 100 to prevent loosening or displacement of wire 202, which could affect the reliability of the electrical connection. The wire 202 extends to the first conductive structure 120 and is electrically connected to it to achieve power supply and control of the light-emitting body. Users can set the position and number of wiring outlets 108 according to actual needs.

In one example of Embodiment 17, the wire-fixing structure 109 is a winding post. The wire 202 is wound around the winding post to secure the wire 202 inside the lamp housing 100.

In another example of Embodiment 17, the wire-fixing structure 109 is a wire channel. The wire 202 passes through the wire channel to secure the wire 202 inside the lamp housing 100.

In some embodiments, the wiring outlet 108 also has an adjustable sliding or rotating mechanism to adjust the position of the inlet opening flexibly or has a sealing cover and waterproof plug to close the opening when not in use, enhancing protection.

F. Base

In this embodiment, as shown in FIG. 33, the base 300 includes an upper housing 320 and a lower cover plate 330. The lower cover plate 330 is detachably connected to the upper housing 320. The upper housing 320 and the lower cover plate 330 define an installation cavity, and the power supply unit 201 is inside the installation cavity. Specifically, the lower cover plate 330 can be connected to the upper housing through screw fastening, snap-fit connection, or other methods. This design separates the lower cover plate 330 from the upper housing 320, facilitating maintenance or replacement of the power supply unit 201.

The embodiments described above are merely examples of the present disclosure, and should not be used to limit the scope of the present disclosure, which may have various modifications and variations made by specialists in the field. Any modification, equivalent replacement or improvement made within the spirits and principles of the present disclosure shall be included in the scope of protection of the present disclosure.

What is claimed is:

1. A decorative tree lamp, comprising:

a lamp housing, with an accommodating cavity inside;

a light-emitting body, which is installed inside or outside the lamp housing;

a base, detachably connected to the lamp housing;

artificial branches, detachably installed on the side wall of the lamp housing and combined with the lamp housing to resemble a shape of a tree;

wherein the bottom of the lamp housing is provided with a first mounting portion, the base is correspondingly provided with a second mounting portion, and the first mounting portion is detachably connected to the second mounting portion, wherein when the first mounting portion and the second mounting portion are connected, the light-emitting body is energized; and the first mounting portion is provided with a first conductive structure, the second mounting portion is provided with a second conductive structure, wherein the first conductive structure comprises a plurality of contacts, and the second conductive structure comprises a circular contact plate and an annular contact plate surrounding the circular contact plate, a first contact corresponds to the circular contact plate, a second contact corresponds to the annular contact plate, and the first conductive structure is capable of rotating around a rotation axis relative to the second conductive structure, such that the first mounting portion is capable of being rotationally matched with the second mounting portion, wherein a common center of the annular contact plate and the circular contact plate is not on the rotation axis.

2. The decorative tree lamp according to claim 1, wherein the base is provided with a power supply unit, the light-emitting body is electrically connected to the first conductive structure, and the power supply unit is electrically connected to the second conductive structure, and wherein when the first mounting portion is connected to the second mounting portion, the first conductive structure and the second conductive structure are electrically connected, and the light-emitting body is energized.

3. The decorative tree lamp according to claim 2, wherein the side wall of the lamp housing is provided with a third mounting portion, and the end of one of the artificial branches is provided with a fourth mounting portion, wherein third mounting portion is detachably connected to the fourth mounting portion.

4. The decorative tree lamp according to claim 3, wherein the third mounting portion is a threaded hole with an internal thread, the fourth mounting portion is an end with an external thread, and the end and the threaded hole are connected through rotation to achieve detachable connection between the third mounting portion and the fourth mounting portion.

5. The decorative tree lamp according to claim 3, wherein the third mounting portion is an insertion hole, the fourth mounting portion is an insertion plug matching the insertion hole, and the insertion plug and the insertion hole are connected through insertion to achieve detachable connection between the third mounting portion and the fourth mounting portion.

6. The decorative tree lamp according to claim 2, further comprises multiple artificial leaves, wherein the side wall of one of the artificial branches is provided with a fifth mounting portion and the bottom of one of the artificial leaves is provided with a sixth mounting portion, wherein the artificial leaf with the sixth mounting portion is detachably connected to the artificial branch through the fifth mounting portion and the sixth mounting portion.

7. The decorative tree lamp according to claim 6, wherein the fifth mounting portion is a threaded hole with an internal thread, the sixth mounting portion is a threaded bolt with an external thread, and the threaded bolt and the threaded hole are connected through rotation to achieve detachable connection between the fifth mounting portion and the sixth mounting portion.

8. The decorative tree lamp according to claim 6, wherein the fifth mounting portion is an insertion hole, the sixth mounting portion is an insertion plug matching the insertion hole, and the insertion plug and the insertion hole are connected through insertion to achieve detachable connection between the fifth mounting portion and the sixth mounting portion.

9. The decorative tree lamp according to claim 2, further comprises multiple artificial fruits, wherein one of the artificial fruits is detachably connected to one of the artificial branches through a seventh mounting portion and an eighth mounting portion, wherein the seventh mounting portion is provided on the side wall of the artificial branch, and the eighth mounting portion is provided at the bottom of the artificial fruit.

10. The decorative tree lamp according to claim 9, wherein the seventh mounting portion is a threaded hole with an internal thread, the eighth mounting portion is a threaded bolt with an external thread, and the threaded bolt and the threaded hole are connected through rotational engagement to achieve detachable connection between the seventh mounting portion and the eight mounting portion.

11. The decorative tree lamp according to claim 2, wherein the lamp housing is made of a transparent material, and its interior forms an accommodating cavity, wherein the light-emitting body is installed in the accommodating cavity of the lamp housing and is used to emit light, wherein the light-emitting body is electrically connected to the first conductive structure through wires.

12. The decorative tree lamp according to claim 2, wherein each of the artificial branches is made of a transparent material, and the inner cavity of one of the artificial branches is provided with a second light-emitting body for emitting light.

13. The decorative tree lamp according to claim 12, wherein the second light-emitting body is installed in the inner cavity of the artificial branch, and the second light-emitting body is electrically connected to the first conductive structure through wires to enable the power supply unit to power the second light-emitting body.

14. The decorative tree lamp according to claim 2, further comprising multiple artificial leaves, wherein a second light-emitting body is installed in the inner cavity of one of the artificial leaves the second light-emitting body is installed in the inner cavity of the artificial leaf, and the second light-emitting body is electrically connected to the first conductive structure through wires to enable the power supply unit to power the second light-emitting body.

15. The decorative tree lamp according to claim 2, further comprising multiple artificial fruits, wherein a second light-emitting body is installed in the inner cavity of one of the artificial, and the second light-emitting body is electrically connected to the first conductive structure through wires to enable the power supply unit to power the second light-emitting body.

16. A decorative tree lamp, comprising:

a lamp housing, with an accommodating cavity inside;

a light-emitting body, which is installed inside or outside the lamp housing;

a base, which is detachably connected to the lamp housing;

artificial branches, detachably installed on the side wall of the lamp housing and combined with the lamp housing to resemble a shape of a tree;

wherein the bottom of the lamp housing is provided with a first mounting portion, and the base is correspondingly provided with a second mounting portion, wherein the first mounting portion and the second mounting portion are detachably connected through a mechanical connection structure;

the first mounting portion is provided with a first conductive structure, and the second mounting portion is provided with a second conductive structure; wherein when the first mounting portion is connected to the second mounting portion, the first conductive structure, and the second conductive structure are electrically connected, and the light-emitting body is energized; wherein the first conductive structure comprises a plurality of contacts, and the second conductive structure comprises a circular contact plate and an annular contact plate surrounding the circular contact plate, a first contact corresponds to the circular contact plate, a second contact corresponds to the annular contact plate, and the first conductive structure is capable of rotating around a rotation axis relative to the second conductive structure, such that the first mounting portion is capable of being rotationally matched with the second mounting portion, wherein a common center of the annular contact plate and the circular contact plate is not on the rotation axis.

* * * * *